United States Patent
Hiraguchi et al.

(10) Patent No.: US 6,758,428 B1
(45) Date of Patent: Jul. 6, 2004

(54) TAPE REEL FOR USE IN MAGNETIC TAPE CASSETTE

(75) Inventors: Kazuo Hiraguchi, Kanagawa (JP);
Hiroyuki Naito, Kanagawa (JP);
Katsuki Asano, Kanagawa (JP);
Shigeru Nishiyama, Kanagawa (JP);
Hideki Uchikura, Kanagawa (JP);
Akihiro Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 154 days.

(21) Appl. No.: 10/009,899

(22) PCT Filed: Jun. 22, 2000

(86) PCT No.: PCT/JP00/04112

§ 371 (c)(1),
(2), (4) Date: Dec. 14, 2001

(87) PCT Pub. No.: WO00/79536

PCT Pub. Date: Dec. 28, 2000

(30) Foreign Application Priority Data

Jun. 23, 1999 (JP) .......................................... 11-177248

(51) Int. Cl.[7] ............................................ G11B 23/087

(52) U.S. Cl. ...................... 242/345; 242/613; 242/613.1
(58) Field of Search ....................... 360/132; 242/326.3, 242/345, 609.1, 613, 613.1

(56) References Cited

U.S. PATENT DOCUMENTS

| | | | | |
|---|---|---|---|---|
| 3,741,497 A | * | 6/1973 | Ganske | 242/613.1 |
| 3,753,533 A | * | 8/1973 | Lyman | 242/326.3 |
| 3,768,242 A | * | 10/1973 | Angst et al. | 242/609.1 |
| 4,205,808 A | * | 6/1980 | Hurtig et al. | |
| 4,760,972 A | * | 8/1988 | Sasaki et al. | 242/613 |
| 4,947,279 A | * | 8/1990 | Cousino | 360/132 |

* cited by examiner

Primary Examiner—William A. Rivera
(74) Attorney, Agent, or Firm—Sughrue Mion, PLLC

(57) ABSTRACT

A receiving surface (625) for use in the supersonic welding of the welding boss (620) of an M cassette tape reel (612a) is composed of the lower surface of a ring portion (626) which is formed so as to extend annularly along the base end of a hub central portion (621) formed in the bottom surface (616a) of a lower reel (616) and also which is projected downward (in FIG. 2) by a given amount from the bottom surface (616a). That is, the receiving surface (625) is situated slightly outside in the radial direction from directly below the welding boss (620).

5 Claims, 24 Drawing Sheets

TAPE REEL FOR USE IN MAGNETIC TAPE CASSETTE

FIELD OF THE INVENTION

The present invention relates to a tape reel for use in a magnetic tape cassette such as a digital video cassette (DVC). In particular, the present invention relates to a structure for improving a supersonically welding of a welding boss of a tape reel, a structure for improving the winding shape of a magnetic tape to be wound around a tape reel, a structure for securing the dustproof property of a magnetic tape cassette when not in use as well as preventing the deformation of a lower flange of a tape reel, a structure for preventing a magnetic tape from being damaged due to its contact with a tape reel, and a structure having a characteristic hub.

Also, the invention relates to a magnetic tape take-up device for winding a magnetic tape around a tape reel and, in particular, to a structure for fixing the winding shape of a magnetic tape with the inner surface of an upper flange of a tape reel as a reference.

RELATED ART

Generally, in audio equipment and video equipment, there is often used a magnetic tape cassette structured such that a magnetic tape wound around a pair of tape reels is runnably held within a cassette half to thereby execute recording and reproduction.

Referring now to FIG. 20, conventionally, for example, as a magnetic tape cassette which is used as a DVC (digital video cassette), there is known a magnetic tape cassette 130 in which a pair of tape reels 131 with a magnetic tape t wound therearound are rotatably supported within a lower cassette half 133 making a pair with an upper cassette half 132.

On both sides of an opening 134 formed on this side in FIG. 20 of the lower cassette half 133, there are disposed tape guides 135 respectively. The two tape guides 135 respectively guide the magnetic tape t which is fed out from one tape reel 131 and is taken up around the other tape reel 131, and allow the magnetic tape t to pass through a given position in the opening 134.

Also, on the rear side of the lower cassette half 133, there is disposed a reel lock member 139 having a tape reel securing arm 138. The reel lock member 139 is energized by a compression coil spring 140 to bring the tape reel securing arm 138 into engagement with two engaging teeth 141 respectively formed on the outer peripheries of the two tape reels 131, thereby preventing the unprepared rotation of the respective tape reels 131. This can prevent the wound magnetic tape t from loosening.

On the upper cassette half 132, there are mounted an outer lid 150 for covering the opening 134 of the lower cassette half 133, an upper lid 151 and an inner lid 152 in such a manner that they can be freely opened and closed.

On the two side plates 153 of the outer lid 150, there are projectingly provided lock pins 154, respectively. The two lock pins 154 are respectively secured to their associated lid locks 155 which are rotatably disposed on the lower cassette half 133. By the way, reference character 156 designates a lid spring to be mounted on the rotary shaft of the outer lid 150.

The tape reels 131 are respectively structured such that mutually opposing upper and lower flanges 142 and 143 are fixed with a given position relationship between them.

That is, in each tape reel 131, a pivot 147 projectingly provided on a hub 145 of the lower flange 143 is fitted into a pivot hole 146 formed in the central portion 144 of the upper flange 143. Also, a welding boss 148, which is provided on and projected from the hub 145 of the lower flange 143 at a position distant in the radial direction from the pivot 147, is fitted into a welding boss hole 149 formed in the central portion 144 of the upper flange 142 at a position corresponding to the welding boss 148. In this state, in case where a welding horn (not shown) is contacted with the substantially central portion of the leading end face (in FIG. 20, the upper end face) of the welding boss 148, the welding boss 148 can be welded supersonically. As a result of this, the mutually opposed upper and lower flanges 142 and 143 can be fixed with a given position relationship between them.

Now, referring to FIGS. 20 and 21, on the bottom surface 143a of the lower flange 143 that is situated on the opposite side of the hub 145, there is disposed a reference ring 157 which provides a reference for working using a metal mold. The reference ring 157 is present at a position which is more distant in the radial direction than the welding boss 148. The surface 157a of the reference ring 157 is used as a receiving surface for receiving the welding boss 148 when it is welded supersonically, because the surface 157a makes it possible to facilitate the grasping of the dimensional relationship. That is, in case where the surface 157a of the reference ring 157 is contacted with a welding receiving base (not shown) when the welding boss 148 is welded supersonically, the surface 157a allows the welding receiving base to receive pressures applied from the welding horns and vibrations caused by the supersonic oscillation.

In the above-mentioned conventional magnetic tape cassette 130, the surface 157a of the reference ring 157 is used as the receiving surface when the welding boss 148 is supersonically welded. Due to this, the oscillation energy of the supersonic waves from the welding horns is in part lost due to the resonance of the components of the tape reel 131 existing from the welding boss 148 to the reference ring 157, resulting in the low transmission efficiency of the oscillation energy of the supersonic waves from the welding horn to the welding boss 148. In case where the transmission efficiency of the oscillation energy of the supersonic waves is low, it takes time to weld the welding boss 148, which makes it necessary to extend the oscillation time of the supersonic waves, resulting in the poor mass-production aptitude and in the poor welding stability. Further, in case where the welding stability is poor, there is a fear that the mutually opposing attitudes of the upper and lower flanges 142 and 143 can be out of balance, giving rise to the vibratory motion of the surfaces of the tape reel 131 when it is rotated.

It is a first object of the invention to provide a tape reel for use in a magnetic tape cassette which can enhance the transmission efficiency of the oscillation energy of the supersonic waves to the welding boss to thereby be able to shorten the time necessary for supersonic welding of the welding boss as well as to enhance the welding stability.

Next, referring to FIG. 22, the inner surface (lower surface) of the upper flange 142 is formed as a sloping surface 142b which gradually slopes upward from the base end portion (in FIG. 22, the upper end portion a) of the side wall 145b of the hub 145 toward the radial-direction outer side (in FIG. 22, the right side) of the upper flange 142. Also, the inner surface (upper surface) of the lower flange 143 is formed as a sloping surface 143b which gradually slopes downward from the base end portion (in FIG. 22, the lower end portion b) of the side wall 145b of the hub 145 toward the radial-direction outer side (in FIG. 22, the right side) of the lower flange 143.

However, in case where such slopes are formed on the whole areas of the lower surface of the upper flange and the lower surface of the lower flange, it is true that, when the magnetic tape is wound, it can be wound easily; but, there is also a fear that the magnetic tape can be vibrated in the vertical direction.

In case where a given period of time passes after the winding operation of them magnetic tape is started, the rotation speed of the reel drive means and the tape tension become constant, so that the magnetic tape runs stably and thus there is no fear that it can be vibrated in the vertical direction. However, at the beginning of the winding operation of the magnetic tape, the rotation speed of the reel drive means increases gradually and the tape tension also increases, so that the magnetic tape is not able to run stably.

In this case, since the magnetic tape is vibrated in the vertical direction, the side edges of the wound magnetic tape cannot be superimposed on each other in a well-arranged manner, so that the wound surface of the magnetic tape to be formed by the side edges of the magnetic tape can be out of order and thus it cannot provide a flat surface; that is, there arises a problem that the magnetic tape cannot have a fine winding shape.

Accordingly, it is a second object of the invention to solve the above problem: that is, it is a second object of the invention to provide a magnetic tape reel which allows a magnetic tape to provide a fine winding shape after it is wound.

Next, referring to FIG. 23, on the edge portions of reel holes 133a formed in the inner surface (in FIG. 23, the upper surface) of the lower cassette half 133, there are provided annular-shaped projecting portions 133b, respectively. These annular-shaped projecting portions 133b, when the magnetic tape cassette 130 is not in use (that is, in the state thereof shown in FIG. 23), are respectively contacted with the outer surfaces of the lower flanges 141 of the respective tape reels 131. Due to this, the annular-shaped projecting portions 133b are respectively able not only to prevent entry of dust into the interior of the magnetic tape cassette 130 as much as possible but also to support the weights of the respective tape reels 131 and the weight of the magnetic tape t wound around the respective tape reels 131.

In the above-mentioned magnetic tape cassette 130, in case where the respective tape reels 131 increase in size (outside diameter), when the magnetic tape cassette 130 is not in use, the lower flanges 141 of the respective tape reels 131 are not be able to support the weight of the magnetic tape t, thereby raising a problem that the portions of the lower flanges 141, which are present outside the contact portions of the lower flanges 141 with their associated annular-shaped projecting portions 53b, can be flexed.

In this case, in case where the thicknesses of the lower flanges 141 of the respective tape reels 131 are increased, the above problem can be solved. However, in case where the thicknesses of the lower flanges 141 increase, there arises another problem that there cannot be secured a clearance between the lower flanges 141 and lower cassette half 133 when the magnetic tape cassette 130 is not in use. In case where such clearance cannot be secured, for example, there arises an inconvenience that, due to the vibrations of the magnetic tape cassette half 130 when it is delivered, the lower flanges 141 and lower cassette half 133 are slidingly contacted with each other.

Accordingly, it is a third object of the invention to provide a magnetic tape cassette which can secure a high dust-proof condition in the interior thereof when it is not in use, can positively prevent the lower flanges of the tape reels against deformation, and can secure a sufficient clearance between the lower flanges and a lower cassette half.

Next, referring to FIG. 24, conventionally, as a magnetic tape cassette for a beta cam, for example, there is known a magnetic tape cassette 230 in which a pair of tape reels 231 with a magnetic tape t wound therearound are rotatably supported within a lower cassette half 233 which makes a pair with an upper cassette half 232.

On the two sides of an opening 234 formed on this side in FIG. 24 of the lower cassette half 233, there are disposed tape guides 235 respectively. The tape guides 235 respectively guide the magnetic tape t, which is fed out from one tape reel 231 and is then taken up around the other tape reel 231, and allows the magnetic tape t to pass through a given position in the opening 234. On the other hand, on the upper cassette half 232, there is openably and closably mounted a lid 250 which covers the opening 234 of the lower cassette half 233.

The tape reels 231 are respectively structured such that, with a given clearance formed between the mutually opposed upper and lower flanges 242 and 243, the central portion 244 of the upper flange 242 and the hub 245 of the lower flange 243.

That is, in each of the tape reels 231, a pivot 247 provided on the hub 245 of the lower flange 243 is fitted into a pivot hole 246 formed in the central portion 244 of the upper flange 242. Also, a plurality of welding bosses 248, which are provided on and projected from the hub 245 of the lower flange 243 at positions spaced from the pivot 247 in the radial direction of the hub 245, are respectively fitted into a plurality of welding boss holes 249 formed in the central portion 244 of the upper flange 242 at positions corresponding to the welding bosses 248.

In this state, in case where welding horns (not shown) are respectively contacted with the substantially central portions of the leading end faces of the respective welding bosses 248, the welding bosses 248 can be welded supersonically. As a result of this, the mutually opposed upper and lower flanges 242 and 243 can be fixed with a given clearance between them.

Referring here to FIG. 25, when the lower flange 243 is molded using a metal mold, in the surface 243a (in FIG. 25, the upper surface) of the lower flange 243 that is disposed opposed to the upper flange 242, there are formed a plurality of air discharging recessed portions 251 (in FIG. 24, not shown) which are spaced at given intervals in the peripheral direction of the opposed surface 243a. The respective air discharging recessed portions 251 discharge the air, which enters the interior of the tape reel together with the magnetic tape t when the magnetic tape t is taken up around the tape reel, externally of the tape reel to thereby prevent the magnetic tape t from being wound in disorder.

In the above-mentioned conventional magnetic tape cassette 230 for a beta cam, substantially over the entire periphery of the edge portions 252 of the air discharging recessed portions 251 of the lower flanges 243, there are generated edges 253 when the magnetic tape cassette 230 is molded using a metal mold. This raises a problem that, when the magnetic tape t is taken up around the tape reel, the edges 253 can be contacted with the magnetic tape t, thereby causing the magnetic tape t to be damaged.

This problem, recently, with the enhanced density of the magnetic tape recording, has a seriously ill effect on the recording accuracy and, especially, in a magnetic tape cassette for business such as a beta cam, this problem is serious.

Accordingly, it is a fourth object of the invention to provide a magnetic tape cassette which can prevent a magnetic tape against damage due to its contact with a tape reel to thereby be able to cope with the enhanced density of the magnetic tape recording.

Also, in the case of a tape reel of the above-mentioned type, since the height of the hub thereof is slightly larger than the width of a magnetic tape, while the magnetic tape is being wound around the tape reel, the magnetic tape can be moved up and down when it is moved in the axial direction of the hub, with the result that the magnetic tape wound around the hub of the tape reel can be projected in part in the axial direction of the hub. In order to prevent this, in JP-A-58-187083U, there is disclosed a tape reel structured such that the peripheral surface of the hub thereof is inclined with respect to the axial direction of the hub. Here, FIG. 26(a) is a section view of the tape reel set forth in the above-cited publication, and FIG. 26(b) is a schematic side view of the hub of the present tape reel.

Specifically, in the conventional tape reel shown in FIG. 26, on the upper and lower surfaces of a hub 320, there are disposed upper and lower flanges 322 and 324; the hub 320 and lower flange 324 are formed of resin as an integral body; and, the central portion of the resin-made upper flange 322, which is produced separately from the hub 320, is supersonically welded to the upper end of the hub 320. Although the outer peripheral surface 320a of the hub 320 is circular, the center line A of the circular-shaped outer peripheral surface 320a is inclined by a given angle θ with respect to the axial direction B of the hub 320. Also, the mutually opposed inner surfaces 322a and 324a of the upper and lower flanges 322 and 324 are respectively formed as sloping surfaces which spread out as they go outwardly in the radial direction thereof. The peripheral surfaces of the hub 320 are inclined over the entire areas thereof; and, the peripheral surfaces of the hub 320, which are disposed 180° opposed to each other when the hub 320 is viewed from the top plan thereof, are inclined in different directions in the axial direction of the hub 320.

According to the above tape reel, since a magnetic tape 326 to be wound around the hub 320 is contacted with either o f the upper flange 322 or lower flange 324 at each angle of 180° when the hub 320 is viewed from the top plan thereof and is thereby restricted in the vertical movement thereof, the magnetic tape 326 can be wound around the hub 320 without being projected in part in the axial direction B of the hub 320.

By the way, generally, the pulling direction of a molding, that is, a molded hub from a metal mold is equal to the axial direction of the hub. However, in the case of the hub 320 shown in FIG. 26 in which the peripheral surfaces of the hub 320 disposed 180° opposed to each other when the hub 320 is viewed from the top plan thereof slope in different directions in the axial direction of the hub 320, after it is injection molded, it cannot be pulled out from the metal mold along the axial direction B thereof as it is. For this reason, to manufacture the hub 320, there is necessary a metal mold using a slide core, which not only complicates the structure of a metal mold but also makes it difficult to manufacture the hub 320.

Accordingly, it is a fifth object of the invention to solve the above problem; in particular, to provide a magnetic reel which is easy to manufacture and around which a magnetic tape can be wound with a good winding shape, and a method for manufacturing such tape reel.

Next, as a magnetic tape take-up apparatus, conventionally, in Japanese Patent Unexamined Publication No. Hei.1-217782, there is disclosed a magnetic tape take-up apparatus 440 structured such that, as shown in FIG. 27, a magnetic tape 444 being wound around a tape reel 441 is energized in the direction of a lower flange 442 not in contact with the lower flange 442 by a permanent magnet 443 disposed opposed to the lower flange 442 of the tape reel 441 to thereby arrange the winding shape of the magnetic tape 444 with the inner surface of the lower flange 442 as a reference surface.

The tape reel 441 is mounted on the rotary shaft 446 of a drive mechanism 445 and, in case where the tape reel 441 is driven or rotated by the drive mechanism 445, it takes up the magnetic tape 444 from a tape supply source onto a tape winding surface 447. The permanent magnet 443 is formed in a doughnut shape; and, with the rotary shaft 446 of the drive mechanism 445 loosely fitted into a through hole 448, the permanent magnet 443 is supported through a support portion 449 on a take-up apparatus main body 450.

In the above-mentioned conventional magnetic tape take-up apparatus 440, the permanent magnet 443 is disposed opposed to the lower flange 442 of the tape reel 441 and is used to arrange the winding shape of the magnetic tape 444 with the inner surface of the lower flange 442 as a reference surface.

Therefore, there arises a problem that, when a magnetic tape cassette is set on a recording and reproducing apparatus and the magnetic tape 444 is then made to run, the running passage of the magnetic tape 444, through which it is made to run for the first time by the recording and reproducing apparatus, is shifted from the running passages thereof through which it is made to run for the second time and following times.

That is, for example, in such a recording and reproducing apparatus 460 as shown in FIG. 28, in the first tape running, a magnetic tape 462, which is wound around a tape reel 461 by the conventional magnetic tape take-up apparatus 440, runs through a passage which is shifted to the lower side in FIG. 28 as shown by a two-dot chained line shown in FIG. 28. The reason for this is as follows: that is, since the lower flange of the tape reel 461 has a taper surface sloping downward toward the radial direction of the tape reel 461, the magnetic tape 462 wound around the tape reel 461 is caused to lower downward gradually toward its outer periphery side. In the second and following tape runnings in which the magnetic tape 462 rewound around the tape reel 461 by the magnetic tape take-up apparatus 440 is made to run again, the magnetic tape 462 runs through its normal running passage which is shown by a solid line in FIG. 28. Thus, the running passage of the magnetic tape is shifted between the first tape running and the second and following tape runnings by the recording and reproducing apparatus 460.

Now, description will be given below in detail of the cause of the shifted running passage of the magnetic tape 462.

Firstly, referring to the running passage of the magnetic tape 462 in the magnetic tape take-up apparatus 440, the magnetic tape 462, which is played out from the tape reel 461 of the magnetic tape cassette 463, is guided by tape guides TG0, TG1, TG2 and TG3. This defines the mutually relative positions of the magnetic tape 462 and a recording and reproducing head 464 (cylinder).

In other words, the magnetic tape 462 drawn out from the tape reel 461 is once raised up to its upper limit position by the tape guide TG1 through the tape guide TG0 and the position of the magnetic tape 462 at the upper limit position is controlled by the tape guide TG1; and, after then, the position of the magnetic tape 462 is controlled to its original position between the tape guides TG2 and TG3, and the magnetic tape 462 is then contacted with the recording and reproducing head 464 at a given relative position.

However, in case where the magnetic tape 462 is wound around the tape reel 461 by the conventional magnetic tape take-up apparatus 440, since the lower flange has a taper surface, the play-out position of the magnetic tape 462 from the tape reel 461 is a low position (a position which near to the lower flange 466) shown by a two-dot chained line in FIG. 28.

Due to this, the magnetic tape 462 drawn out from the tape reel 461, as shown by the two-dot chained line in FIG. 28, is not be able to reach the upper limit position to which it ought to be guided by the tape guide TG1; and, therefore, without being controlled in position at the upper limit position by the tape guide TG1, the magnetic tape 462 is controlled in position by the tape guides TG2 and TG3. As a result of this, the running passage of the magnetic tape 462 between the tape guides TG2 and TG3 is shifted from its normal or original running passage. This phenomenon occurs more outstandingly as the magnetic tape 462 wound is present on the outer periphery side.

In case where, as described above, the running passage of the magnetic tape 462 is shifted between the first tape running and the second and following tape runnings by the recording and reproducing apparatus 460, the relative positions of the magnetic tape 462 and recording and reproducing head 464 in the first tape running is different from the relative positions of the magnetic tape 462 and recording and reproducing head 464 in the second and following tape runnings. As a result of this, there arises a problem that, in the recording and reproducing states of the magnetic tape 462, there occurs a serious fault, such as poor interchangeability which cannot be repaired.

Accordingly, it is a sixth object of the invention to provide a magnetic tape take-up apparatus which can arrange the winding shape of a magnetic tape with the upper flange of a tape reel as a reference to thereby be able to stabilize the running of the magnetic tape in a recording and reproducing apparatus.

DISCLOSURE OF THE INVENTION

In attaining the above-mentioned first object, according to a first invention, there is provided a tape reel for use in a magnetic tape cassette, comprising: an upper flange; and, a lower flange disposed opposed to the upper flange and including a hub on the surface thereof opposed to the central portion of the upper flange, wherein a pivot provided on and projected from the hub is fitted into a pivot hole formed in the central portion of the upper flange, a welding boss projectingly disposed at a position of the hub distant from the pivot in the radial direction of the hub is fitted into a welding boss hole formed in the central portion of the upper flange, and, in this state, the welding boss is welded supersonically, whereby the upper and lower flanges are fixed with a given position relationship between them, characterized in that, on the opposite surface of the lower flange to the hub, there are disposed not only a reference ring which is used as a reference for working the tape reel using a metal mold but also, radially inside the reference ring, a receiving surface for use in the supersonic welding of the welding boss.

In the tape reel for use in a magnetic tape cassette according to the first invention, the pivot projectingly provided on the hub formed integral with the lower flange is fitted into the pivot hole formed in the central portion of the upper flange. Also, the welding boss projectingly disposed at a position of the hub distant from the pivot in the radial direction of the hub is fitted into the welding boss hole formed in the central portion of the upper flange. In this state, the welding boss is welded supersonically. Due to this, the upper and lower flanges are fixed with a given position relationship between them.

On the opposite surface of the lower flange to the hub, there is disposed the reference ring which is used as a reference for working the tape reel using a metal mold and, in the portion of the opposite surface of the lower flange to the hub that is situated internally of the reference ring in the radial direction of the tape reel, there is formed the receiving surface for use in the supersonic welding of the welding boss.

In case where the receiving surface, in the supersonic welding of the welding boss, is contacted, for example, with a welding receiving base, the welding boss allows the welding receiving base to receive not only pressures applied from welding horns but also vibrations caused by the oscillation of the supersonic waves. In this case, since the receiving surface is situated in the portion of the opposite surface of the lower flange to the hub that is situated internally of the reference ring in the radial direction of the tape reel, the oscillation energy of the supersonic waves from the welding horns can be prevented from being lost by the resonance of the components disposed from the welding boss to the reference ring.

Also, in attaining the above second object, according to a second invention, there is provided a magnetic tape reel, comprising: a hub for winding a magnetic tape therearound; and, upper and lower flanges respectively positioned on the upper and lower ends of the hub, each of the inner surfaces of the upper and lower flanges being formed so as to slope outwardly in the radial direction of the magnetic tape reel, wherein, on the adjacent portions of the upper and lower flanges to the hub, there are respectively formed flat surfaces lying at right angles to the side surface of the hub and having a given width in the radial direction of the magnetic tape reel.

The radial-direction width of each of the flat surfaces may be preferably larger than the tape winding thickness obtained before, in the tape take-up operation, the motor speed or the tape tensile force becomes constant from the beginning of the tape take-up operation, that is, before the tape take-up ability becomes constant. Specifically, for example, in the case of the above-mentioned DVC, for all sizes of S, M, L, the radial-direction width of the flat surface may be larger than the thickness of a clamp for fixing a tape to the hub, in more specifically, the width may be preferably set in the range of 0.5–5.0 mm.

Also, the clearance between the upper and lower flat surfaces may be set slightly larger than the width of the magnetic tape and may be set as narrowly as possible so long as it does not provide any obstacle to the running of the magnetic tape.

According to the second invention, the portions of the flanges existing in the periphery of the hub do not slope but the flanges are parallel to each other and, in the beginning of the winding operation of the magnetic tape, there is no room for the magnetic tape to move up and down; and, therefore, the winding surface of the magnetic tape consisting of the side edges of the magnetic tape is arranged uniformly, thereby allowing the magnetic tape wound to have a good winding shape.

Also, in attaining the above third object, according to a third invention, there is provided a magnetic tape cassette, comprising: a tape reel including upper and lower flanges, the upper and lower flanges being disposed opposed to each other and fixed with a given position relationship between them; an upper cassette half; and, a lower cassette half disposed opposed to the upper cassette half, the lower cassette half being capable of storing the tape reel in an internal space formed between the upper cassette half and itself, the lower cassette half including a reel hole for insertion and removal of tape reel drive means, wherein the lower flange of the tape reel includes a large-thickness stepped portion formed so as to be continuous with an outside annular-shaped rib, while the portion of the large-thickness stepped portion opposed to the edge portion of the reel hole of the lower cassette half has a thickness set at a given value or more.

Also, in attaining the above third object, according to a fourth invention, there is provided a magnetic tape cassette, comprising: a tape reel including upper and lower flanges, the upper and lower flanges being disposed opposed to each other and fixed with a given position relationship between them; an upper cassette half; and; a lower cassette half disposed opposed to the upper cassette half, the lower cassette half being capable of storing the tape reel in an internal space formed between the upper cassette half and itself, the lower cassette half including a reel hole for insertion and removal of tape reel drive means, wherein, on the edge portion of the reel hole formed in the inner surface of the lower cassette half, there is disposed an annular-shaped projecting portion and, on the radial-direction outside of the annular-shaped projecting portion, there is formed an annular-shaped recessed portion, and, also wherein, in a position which is present in the outer surface of the lower flange of the tape reel and is opposed to the annular-shaped recessed portion, there is disposed an annular-shaped projection to be loosely fitted into the annular-shaped recessed portion.

In the magnetic tape cassette according to the third invention, when the present magnetic tape cassette is not in use, the large-thickness stepped portion formed so as to be continuous with an outside annular-shaped rib, with the portion thereof opposed to the edge portion of the reel hole of the lower cassette half having a thickness set at a given value or more, is contacted with the edge portion of the reel hole of the lower cassette half.

In this state, entry of dust into the interior of the magnetic tape cassette can be prevented and thus a highly dust-proof effect can be secured.

Also, tape reels and a magnetic tape wound around the tape reels are supported on the lower cassette half through the large-thickness stepped portions of the lower flanges of the tape reels with the portions thereof having a thickness set at a given value or more. Not only due to such support of the tape reels through the large-thickness stepped portions of the lower flanges formed continuous with the outside annular-shaped ribs and having a thickness set at a given value or more but also due to the enhanced rigidity of the lower flanges of the tape reels by the portions of the lower flanges having a thickness set at a given value or more, even in a tape reel having a large diameter, deformation of the lower flange of the tape reel due to the weight of the magnetic tape can be prevented positively. Thanks to this, when the magnetic tape cassette is not in use, there can be secured a sufficient clearance between the lower flanges of the tape reels and lower cassette half.

In the magnetic tape cassette according to the fourth invention, when the present magnetic tape cassette is not in use, the annular-shaped projecting portion of the lower half cassette is contacted with the outer surfaces of the lower flanges of the tape reels, and the annular-shaped projections of the lower flanges are loosely fitted into the annular-shaped recessed portion of the lower cassette half and are thereby contacted with the lower cassette half.

In this state, entry of dust into the interior of the magnetic tape cassette can be prevented and thus a highly dust-proof effect can be secured.

Also, tape reels and a magnetic tape wound around the tape reels are supported on the lower cassette half through the annular-shaped projecting portion of the lower cassette half and the annular-shaped projections of the lower flanges. Due to support of the tape reels through the annular-shaped projecting portion of the lower cassette half and the annular-shaped projections of the lower flanges, even in a tape reel having a large diameter, deformation of the lower flange of the tape reel due to the weight of the magnetic tape can be prevented positively. Thanks to this, when the magnetic tape cassette is not in use, there can be secured a sufficient clearance between the lower flanges of the tape reels and lower cassette half.

And, in attaining the above fourth object, according to a fifth invention, there is provided a magnetic tape cassette including a tape reel, the tape reel comprising: an upper flange; and, a lower flange disposed opposed to the upper flange and fixed with a given position relationship with respect to the upper flange, the lower flange including a hub providing a winding surface for winding a magnetic tape therearound, wherein, in the surface of the upper flange that is opposed to the lower flange, or, in the surface of the lower flange that is opposed to the upper flange, there is formed an air discharging recessed portion or an air discharging penetration hole for discharging out the air entering together with a magnetic tape when the magnetic tape is wound around the reel, and, also wherein the edge portions of two sides of the air discharging recessed portion or the air discharging penetration hole in at least radial direction of the flanges are formed into a curve-shape respectively.

In the magnetic tape cassette according to the fifth invention, when the magnetic tape is taken up around the tape reel, the air discharging recessed portion or air discharging penetration hole functions as a flow passage for discharging the accompanying air, thereby being able to prevent the magnetic tape from being wound in disorder. In this case, even when the magnetic tape is contacted with the edge portion of the air discharging recessed portion of the tape reel, the required curved shape applied to the edge portion can prevent the magnetic tape against damage.

Also, in attaining the above fifth object, according to a sixth invention, there is provided a magnetic tape reel, wherein the outer surface of a clamp member for holding a leader tape between itself and a recessed portion formed in a hub for winding a magnetic tape therearound and the peripheral surface of the hub that, when viewed from the top plan surface of the hub, is disposed 180° opposed to the recessed portion are respectively taper surfaces which slope in mutually different directions in the axial direction of the magnetic tape reel.

Further, in attaining the above fifth object, according to a seventh invention, there is provided a method for manufacturing a magnetic tape reel having a structure that, in a hub for winding a magnetic tape therearound, there is formed a recessed portion for holding a leader tape using a clamp member, and the peripheral surface of the hub that, when viewed from the top plan surface of the hub, is disposed 180° opposed to the recessed portion is a taper surface sloping toward the axial direction of the hub, the method comprising the steps of: injection molding the magnetic tape reel; and, pulling out the injection molded magnetic tape reel along the axial direction thereof.

According to the sixth and seventh inventions, the hub includes the sloping peripheral surface only on one side thereof and the recessed portion of the hub, which is formed on the opposite side of the sloping peripheral surface and into which the clamp member can be fitted, does not have any gradient. Therefore, after the magnetic tape reel is molded, the hub, as it is, can be pulled out along the axial direction of the magnetic tape reel. This does not require a complicated metal mold using a slide core and thus the hub can be manufactured easily using a metal mold having a simple structure.

Also, in the case of the clamp member, there is formed a sloping surface on the peripheral surface thereof but, after it is injection molded, it can be pulled out along the axial direction thereof as it is. Therefore, also when manufacturing the clamp member, there is not required a complicated metal mold using a slide core and thus the clamp member can be manufactured easily using a metal mold having a simple structure.

Further, in attaining the above sixth object, according to an eighth invention, there is provided a magnetic tape take-up apparatus, comprising: drive means for rotating a tape reel to thereby wind a magnetic tape around the tape reel at a winding speed of 2–2.5 m/s and with a winding tension of 60–70 g; and, magnetic field generating means including a magnet formed of neodymium and having a magnetic flux density of 12800–13300 G, and disposed opposed to the upper flange of the tape reel with a clearance of 12–17 mm between them for applying a magnetic field to the magnetic tape from the upper flange side of the tape reel.

The area of the portion of the magnetic field generating means opposed to the upper flange of the tape reel may be preferably 1.3 times or more the area of the side surface side of the magnetic tape to be wound around the tape reel.

In the magnetic tape take-up apparatus according to the eighth invention, the drive means rotates the tape reel to thereby wind a magnetic tape from a tape supply source around the tape reel at a winding speed of 2–2.5 m/s and with a winding tension of 60–70 g. Also, the magnetic field generating means including a magnet formed of neodymium and having a magnetic flux density of 12800–13300 G applies a magnetic field to the magnetic tape from a position where it is opposed to the upper flange of the tape reel with a clearance of 12–17 mm between them. Due to this, the magnetic field given by the magnetic field generating means can be applied uniformly to the magnetic tape from the upper flange side of the tape reel.

In the magnetic tape take-up apparatus according to the eighth invention, the area of the portion of the magnetic field generating means opposed to the upper flange of the tape reel, preferably, may be set 1.3 times or more the area of the side surface side of the magnetic tape to be wound around the tape reel.

BEST MODE FOR CARRYING OUT THE INVENTION

Now, description will be given below of the preferred embodiments of the invention with reference to the accompanying drawings.

Figure 1:
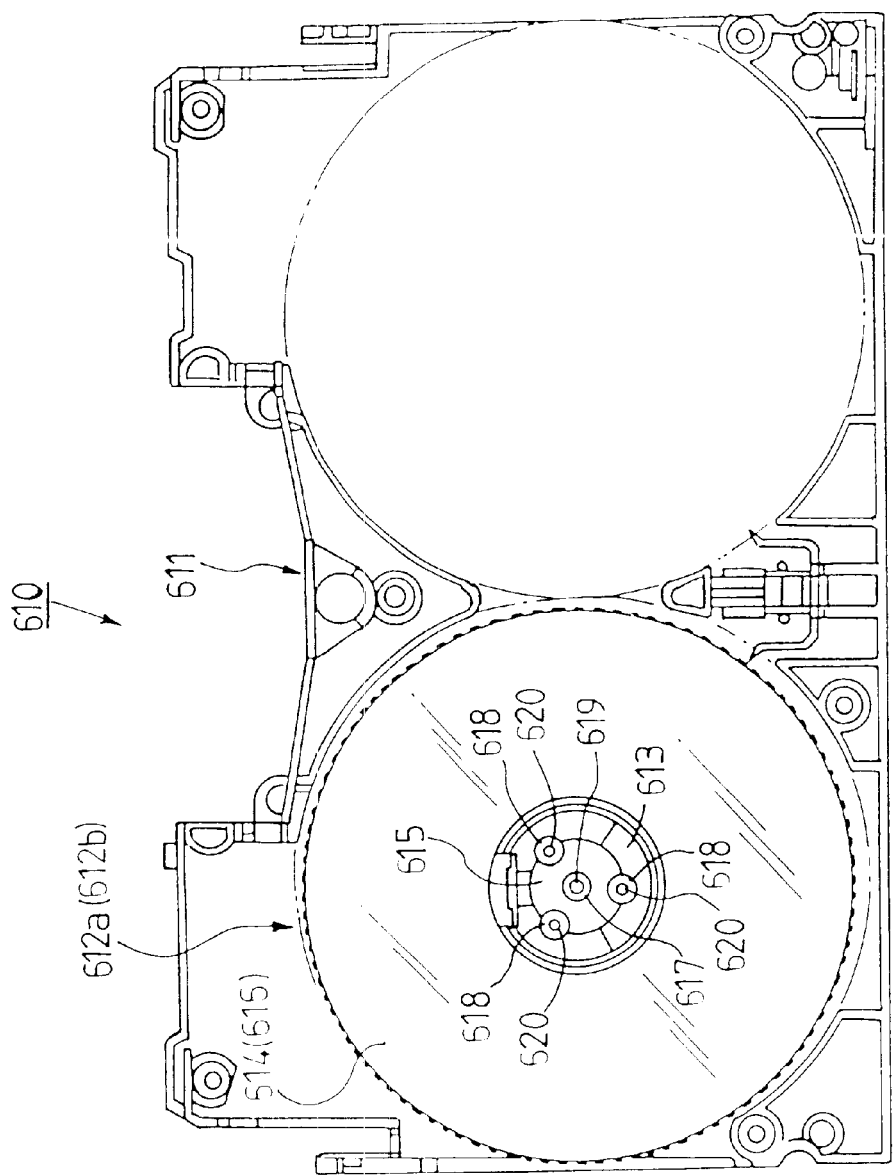
FIG. 1 is a plan view of a lower cassette half of a magnetic tape cassette incorporating therein a tape reel according to an embodiment of the first invention.
Figure 2:
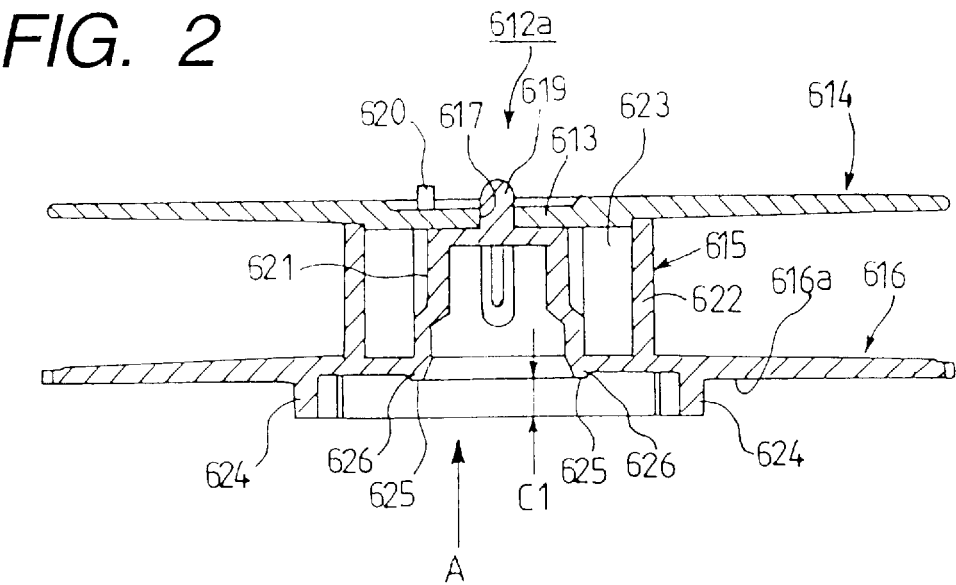
FIG. 2 is a section view of a tape reel for an M cassette.
Figure 3:
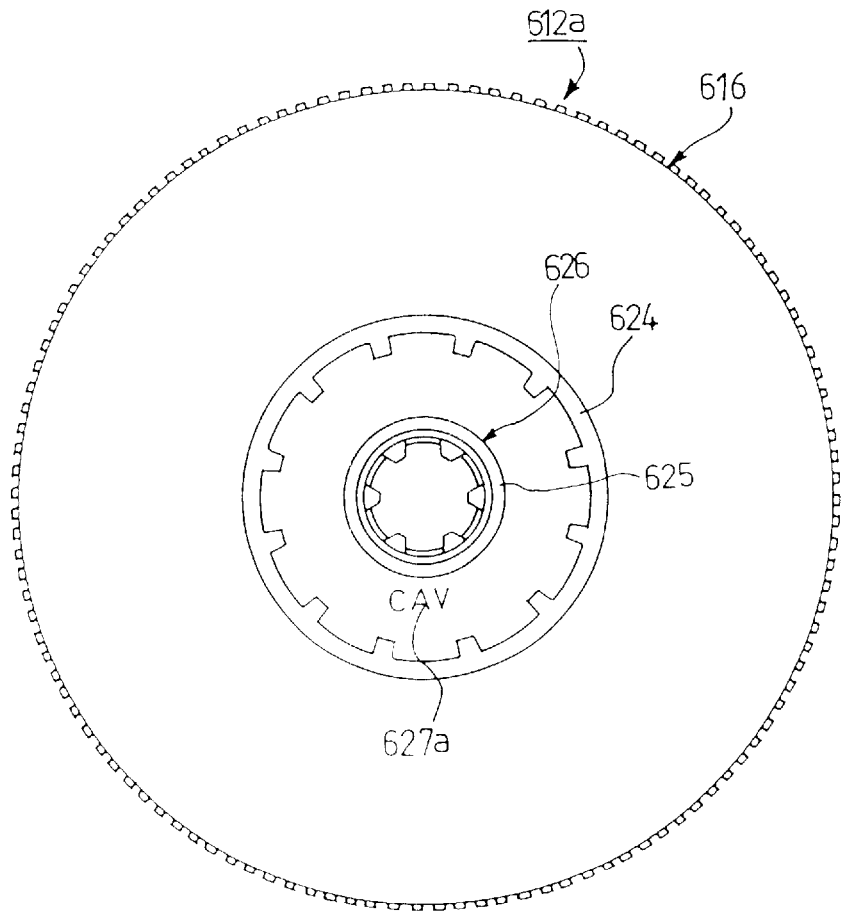
FIG. 3 is a bottom plan view of the M cassette tape reel shown in FIG. 2, taken along the arrow mark A in FIG. 2.
Figure 4:
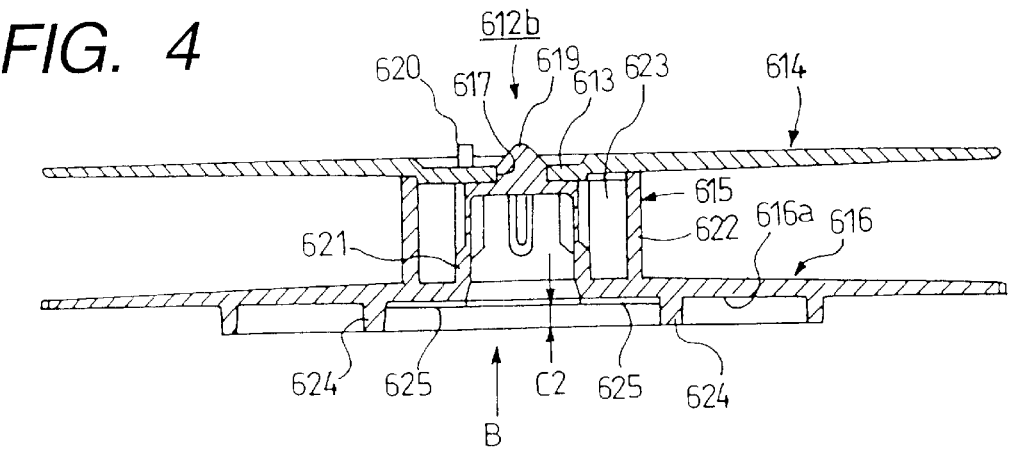
FIG. 4 is a section view of a tape reel for an L cassette.
Figure 5:
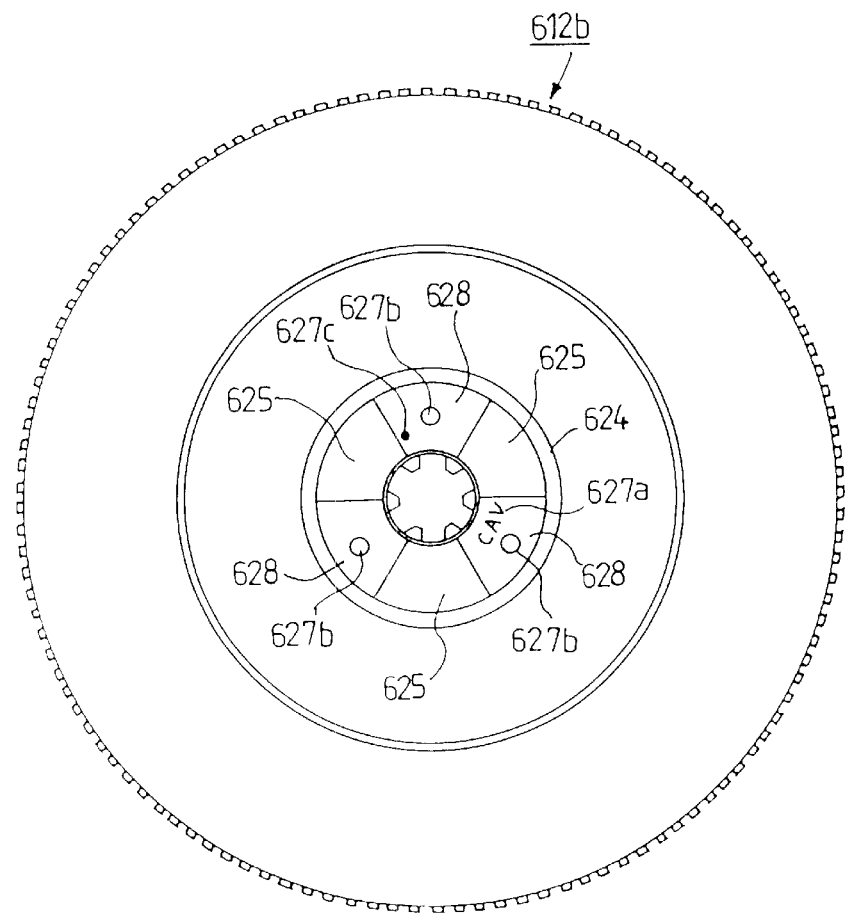
FIG. 5 is a bottom plan view of the L cassette tape reel shown in FIG. 4, taken along the arrow mark B in FIG. 4.

FIG. 1 is a plan view of a lower cassette half of a magnetic tape cassette to which a tape reel according to an embodiment of the first invention is applied. Also, FIG. 2 is a section view of a tape reel for an M cassette and FIG. 3 is a bottom plan view of the M cassette tape reel shown in FIG. 2, taken along the arrow mark A in FIG. 2. Further, FIG. 4 is a section view of a tape reel for an L cassette and FIG. 5 is a bottom plan view of the L cassette tape reel shown in FIG. 4, taken along the arrow mark B in FIG. 4.

Figure 20:
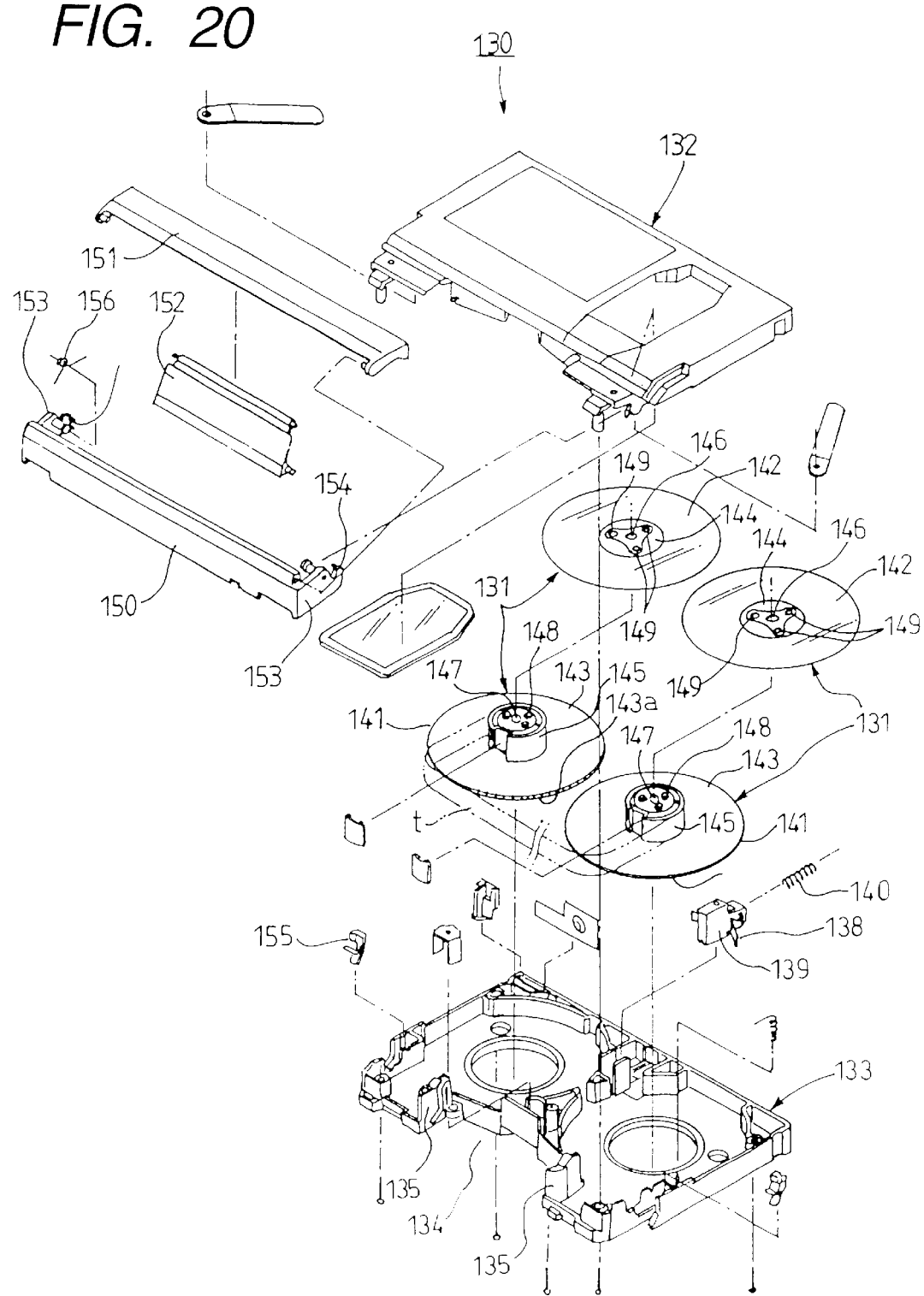
FIG. 20 is an exploded perspective view of a conventional magnetic tape cassette (DVC)

In FIG. 1, a magnetic tape cassette 610 of an M size or an L size is structured such that a pair of tape reels 612a, 612b (in FIG. 1, a tape reel disposed on the right side is not shown) with a magnetic tape t (see FIG. 20) wound therearound are rotatably supported on a lower cassette half 611 making a pair with an upper cassette half (not shown). The lower cassette half 611 is integrally molded of synthetic resin such as ABS resin.

Referring to FIGS. 1 to 5, the tape reel 612a of the magnetic tape cassette 610 of an M size (which is hereinafter referred to as M cassette tape reel 612a), or the tape reel 612b of the magnetic tape cassette 610 of an L size (which is hereinafter referred to as L cassette tape reel 612b) includes an upper flange 614, and a lower flange 616 disposed opposed to the upper flange 614 and including a hub 615 provided on the surface thereof that is opposed to the central portion 613 of the upper flange 614.

The upper and lower flanges 614 and 616 are fixed with a given position relationship between them. The upper flange 614 is integrally molded of, for example, transparent synthetic resin, whereas the lower flange 616 is integrally molded of, for example, opaque synthetic resin.

In the upper flange 614, there are formed a pivot hole 617 and a welding boss hole 618. The pivot hole 617 is formed so as to penetrate substantially through the center of the central portion 613 of the upper flange 614. The welding boss hole 618 is formed so as to penetrate through the position of the central portion 613 of the upper flange 614 that corresponds to a welding boss 620 (which will be discussed later), while the number of welding boss holes 618 is set equal to the number of welding bosses 620.

Referring here to FIGS. 1, 2 and 4, in the case of the lower flange 616, there are projectingly provided a pivot 619 and a welding boss 620 on the upper surface of the hub 615. That is, the hub 615 is structured such that: on the periphery thereof that is distant in the radial direction from a hub central portion 621 thereof, there is formed a side wall 622 serving as a winding surface for a magnetic tape t; and, the hub central portion 621 and side wall 622 are connected together by a plurality of ribs 623 extending along the radial direction of the hub 615:

The pivot 619 is provided on and projected from the center of the upper surface of the hub central portion 621. Also, in the case of the welding boss 620, two or more units (in FIG. 1, three units) of the welding boss 620 are projectingly provided on the upper surface of the hub central portion 621 at given intervals in the peripheral direction of the hub 615.

In each of the tape reels 612a, 612b, the pivot 619 projectingly provided on the hub 615 of the lower flange 616 is fitted into the pivot holes 617 formed in the central portion 613 of the upper flange 614. Also, the welding bosses 620 projectingly provided on the hub 615 of the lower flange 616 are respectively fitted into their associated welding boss holes 618 formed in the central portion 613 of the upper flange 614. In the thus fitted state, in case where welding horns (not shown) are respectively contacted with the substantially central portions of the leading end faces (in FIGS. 2 and 4, the upper end faces) of the welding bosses 620, the welding bosses 620 can be supersonically welded respectively. Due to this, the upper and lower flanges 614 and 616 can be fixed with a given position relationship between them.

On the opposite surface 616a (which is hereinafter referred to as a bottom surface 616a) of the lower flange 616 to the hub 615, there is disposed a reference ring 624 which is used as a reference for working the tape reel using a metal mold. Also, in the portion of the bottom surface 616a of the lower flange 616 that exists inwardly of the reference ring 624 in the radial direction of the lower flange 616, there is formed a receiving surface 625 which can be used in the supersonic welding of the welding boss 620. The receiving surface 625, when the welding boss 620 is welded supersonically, is contacted with a welding receiving base (not shown) to thereby allow the welding receiving base to receive pressures from the welding horns as well as vibrations caused by the oscillation of supersonic waves.

That is, referring to FIGS. 2 and 3, in the lower flange 616 of the M cassette tape reel 612a, the receiving surface 625 is composed of the lower surface (in FIG. 2) of a ring portion 626 which projects downward in FIG. 2 annularly by a given amount from the bottom surface 616a along the base end of the hub central portion 621 of the bottom surface 616a of the lower flange 616. Also, the receiving surface 625 is situated slightly outwardly of just below the welding boss 620 in the radial direction of the lower flange 616. In a space formed between the reference ring 624 and receiving surface 625 of the bottom surface 616a, there is disposed a projecting portion 627a such as a cavity number.

Also, referring to FIGS. 4 and 5, in the lower flange 616 of the L cassette tape reel 612b, the receiving surface is composed of two or more (in FIG. 5, three) areas spaced at regular intervals in the peripheral direction of the lower flange 616 between the base end of the hub central portion 621 of the bottom surface 616a of the lower flange 616 and the inner peripheral surface of the reference ring 624. That is, in case where a space between the base end of the hub central portion 621 of the bottom surface 616a of the lower flange 616 and the inner peripheral surface of the reference ring 624 is divided into six equal areas in the area ratio, the receiving surface 625 is composed of the three divided areas with one area between them, while the present three areas project downward in FIG. 4 by a given amount over the remaining three areas. The radial-direction inner ends of the respective areas forming the receiving surface 625 are situated almost directly below the welding bosses 620 respectively. In the remaining areas 628 which do not form the receiving surface 625, there are disposed a projecting portion 627a for a cavity number, a projecting-out trace 627b, and a gate projecting portion 627c, respectively.

Referring now to FIGS. 2 and 4, clearances C1, C2 along the vertical direction in FIGS. 2 and 4 between the receiving surface 625 and the reference surface (in FIGS. 2 and 4, the lower surface) of the reference ring 624 are substantially equal in the lower flange 616 of the M cassette tape reel 612a and in the lower flange 616 of the L cassette tape reel 612b (C1=C2). Therefore, when the welding bosses 620 are welded supersonically, the relative positions of the tape reels 612a, 612b to the welding receiving base to be contacted by the receiving surfaces 625 of the tape reels 612a, 612b need not be changed in the M cassette tape reel 612a and L cassette tape reel 612b. Thanks to this, the supersonic welding of the welding bosses 620 of the M cassette tape reel 612a and the supersonic welding of the welding bosses 620 of the L cassette tape reel 612b can be executed using the same equipment.

Next, description will be given below of the operation of the present embodiment.

When the welding bosses 620 are welded supersonically, the receiving surface 625 is contacted with the welding receiving base to thereby allow the welding base to receive pressures from the welding horns as well as vibrations caused by the oscillation of the supersonic waves. The receiving surface 625 of the M cassette tape reel 612a is composed of the lower surface (in FIG. 2) of the ring portion 626 which extends annularly along the base end of the central portion 621 of the bottom surface 616a of the lower flange 616 and projects downward (in FIG. 2) by a given amount from the bottom surface 616a. Also, the receiving surface 625 of the L cassette tape reel 612b is formed of three areas which are present between the base end of the central portion 621 of the bottom surface 616a of the lower flange 616 and the inner peripheral surface of the reference ring 624 and are spaced from each other at equal intervals in the peripheral direction of the lower flange 616.

Due to the above-mentioned position relationship between the receiving surface 625 and reference ring 624, the receiving surface 625 contacted with the welding receiving base supports the welding bosses 648 substantially from directly below them. Therefore, the oscillation energy of the supersonic waves from the welding horns can be transmitted effectively from the welding horns to the welding bosses 620 without suffering any loss due to the resonance of the portions of the tape reels 612a, 612b that are present between the welding bosses 620 and reference ring 624.

According to the above embodiment, the receiving surface 625 of the M cassette tape reel 612a is formed of the lower surface (in FIG. 2) of the ring portion 626 which extends annularly along the base end of the central portion 621 of the bottom surface 616a of the lower flange 616 and projects downward (in FIG. 2) by a given amount from the bottom surface 616a, and also the receiving surface 625 of the L cassette tape reel 612b is formed of the three areas which are present between the base end of the central portion 621 of the bottom surface 616a of the lower flange 616 and the inner peripheral surface of the reference ring 624 and are spaced from each other at equal intervals in the peripheral direction of the lower flange 616. Therefore, the oscillation energy of the supersonic waves from the welding horns can be transmitted effectively from the welding horns to the welding bosses 620 without suffering any loss due to the resonance of the portions of the tape reels 612a, 612b that are present between the welding bosses 620 and reference ring 624. Thanks to this, not only the transmission efficiency of the oscillation energy of the supersonic waves from the welding horns to the welding bosses 620 can be enhanced, but also reduction in the welding time as well as mass-production aptitude and welding stability can be secured.

As described above, according to the first invention, since the receiving surface, which is used when the welding bosses are welded supersonically, is formed in the opposite surface of the lower flange to the hub, specifically, on the side of the present lower flange surface that is situated inside the reference ring in the radial direction of the lower flange, the transmission efficiency of the oscillation energy of the supersonic waves to the welding bosses 620 can be enhanced. This makes it possible not only to reduce the time necessary for supersonic welding of the welding bosses but also to enhance the welding stability.

Also, since the distance between the reference ring and receiving surface is set constant regardless of the sizes of the tape reels, the welding operation can be enforced using the same equipment.

Figure 6:
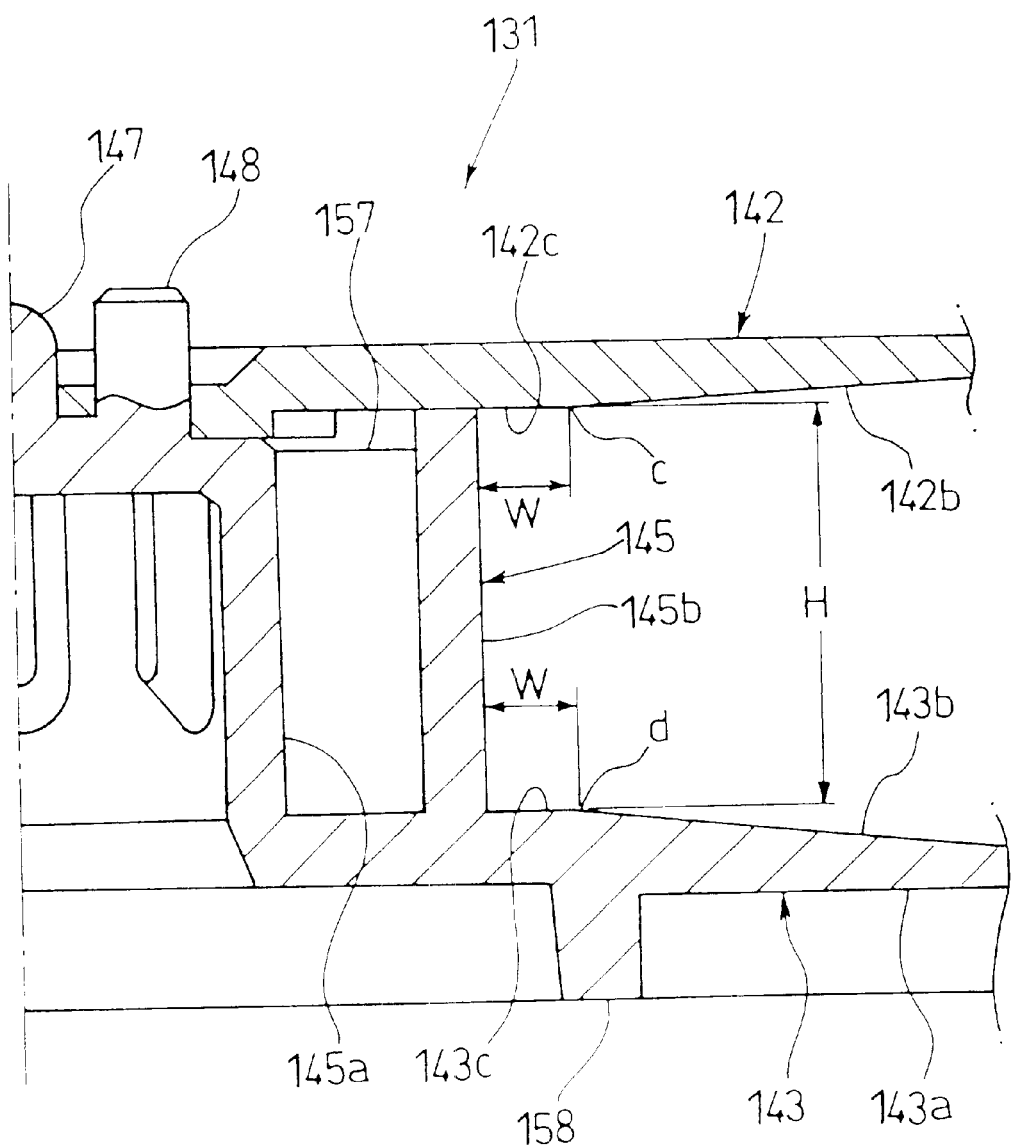
FIG. 6 is a half section view of the main portions of a magnetic tape reel according to an embodiment of the second invention.
Figure 21:
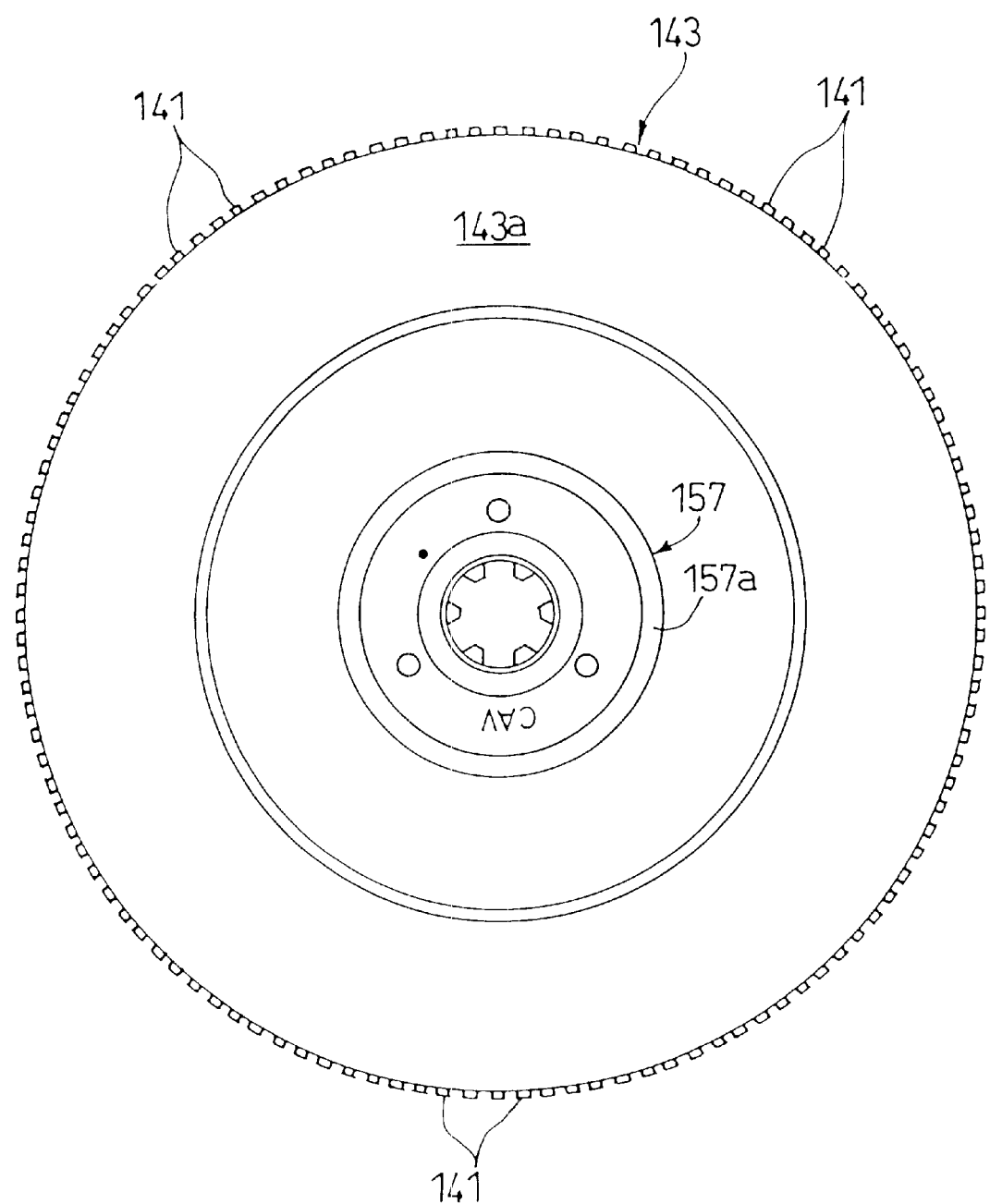
FIG. 21 is a bottom plan view of a conventional L cassette tape reel.
Figure 22:
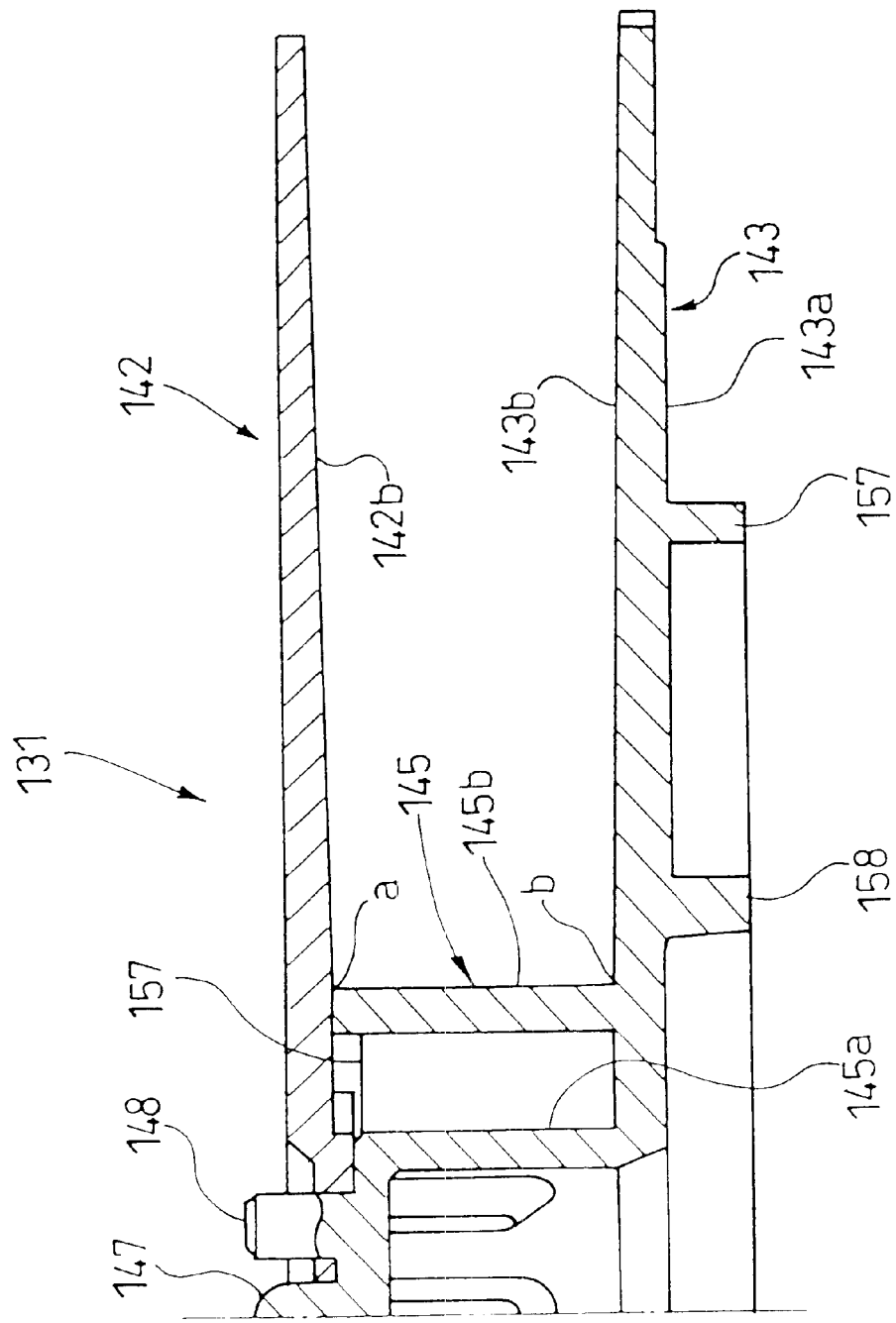
FIG. 22 is a half section view of a conventional magnetic tape reel.
Figure 23:
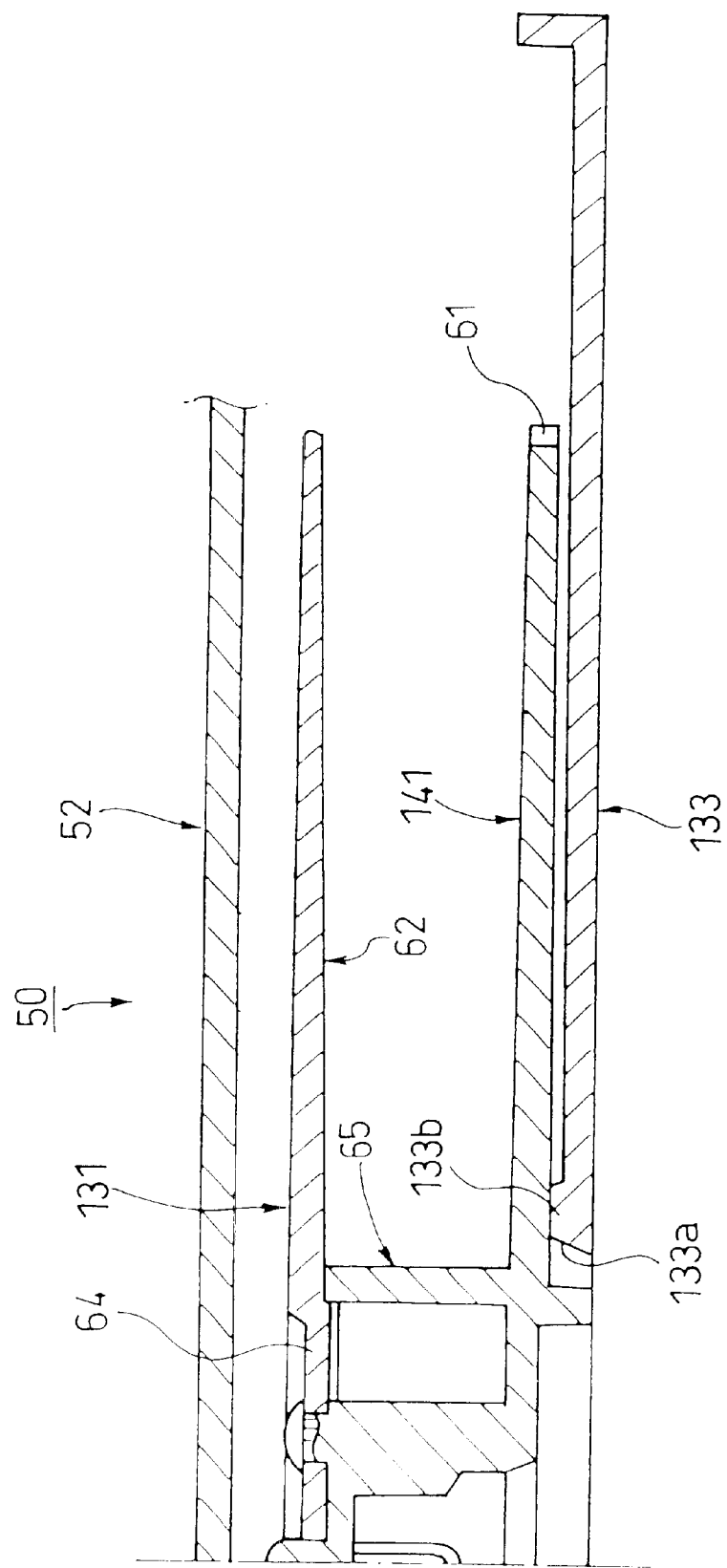
FIG. 23 is a section view of the main portions of a conventional magnetic tape reel.

Next, description will be given below of an embodiment according a second invention. Here, FIG. 6 is a half section view of the main portions of a magnetic tape reel according to an embodiment of the second invention. By the way, the present embodiment is almost similar in structure to the conventional magnetic tape reel shown in FIGS. 20 to 22 except for a few parts thereof. Therefore, the same parts thereof are given the same designations and thus the description thereof is omitted or simplified here.

The magnetic tape reel shown in FIG. 6 is an M-size magnetic tape reel to be provided in a digital video cassette (which is hereinafter referred to as [DVC]) for use in a broadcasting station. On the inner surface of an upper flange 142, there is formed a sloping surface 142b which slopes upward from the vicinity of a hub 145 outwardly in the radial direction of the upper flange 142; and, on the inner surface of a lower flange 143, there is formed a sloping surface 143b sloping downward from the vicinity of the hub 145 outwardly in the radial direction of the lower flange 143. By the way, in FIG. 6, to facilitate the understanding of the sloping surfaces, the gradient thereof is expressed exaggeratedly.

Also, on the inner surfaces of the upper and lower flanges 142, 143, adjacently to the side wall 145b of the hub 145, there are formed flat surfaces 142c, 143c intersecting at right angles to the side wall 145b and having a given width W between the side wall 145b and sloping surfaces 142b, 143b. The two flat surfaces 142c, 143c are formed in a ring shape which surrounds the side wall 145b.

The widths W of the two flat surfaces 142c, 143c are set equal to each other; and, this width W corresponds to or more than the tape winding thickness which is obtained before, after the winding of the magnetic tape starts, the running speed and tape tension of the magnetic tape respectively become constant and the running of the magnetic tape is thereby stabilized. Also, a clearance H between the two flat surfaces 142c, 143c is equal to the height of the side wall 145b and is slightly larger than the width of the magnetic tape; and, the clearance H is set as narrow as possible unless it provides an obstacle to the running of the magnetic tape.

In the case of the present embodiment, since the magnetic tape reel is an M-size reel for use in a DVC, for the width 6.35 mm of the magnetic tape, the widths W of the two flat surfaces 142c, 143c are respectively 2.3 mm, and the clearance H between the two flat surfaces 142c, 143c is 6.7 mm.

The upper and lower sloping surfaces 142b, 143b start to slope at the boundary portions c, d with respect to the two flat surfaces 142c, 143c; and, as they approach outwardly in the radial direction, the clearance between the upper and lower flanges widens, thereby being able to facilitate the running of the magnetic tape.

The magnetic tape is wound around the magnetic tape reel in such a manner that it is connected to one end of a leader tape and the other end of the leader tape is fixed to the side wall 145b of the hub 145 by a clamping pin.

Next, description will be given below of the operation of the present embodiment.

In case where a magnetic tape cassette is loaded into a recording and reproducing apparatus and the winding operation of a magnetic tape is started, in the early winding stage, the rotating speed of the reel drive means increases gradually and, therefore, the running speed of the magnetic tape also increases gradually. Due to this, in the early winding stage of the magnetic tape, the running condition of the magnetic tape is not stable but there is a fear that the magnetic tape can be vibrated in the vertical direction.

However, in the early winding stage where the magnetic tape is wound between the two flat surfaces 142c, 143c, the upper and lower edges of the magnetic tape are regulated by the flat surfaces 142c, 143c of the upper and lower flanges and, therefore, even though the running condition of the magnetic tape is not stable, the magnetic tape is prevented from being vibrated in the vertical direction. As a result of this, the side edges of the magnetic tape are arranged in order, and the tape winding surface formed by the tape side edges becomes flat, thereby being able to provide a good winding shape.

Also, when the magnetic tape is wound between the two sloping surfaces 142b, 143b after it moves beyond between the two flat surfaces 142c, 143c, not only the reel drive means has already been rotating at a constant speed but also the tape speed and tape tension have also been stabilized. Therefore, when the magnetic tape is wound between the two sloping surfaces 142b, 143b, there is no fear that the magnetic tape can be vibrated in the vertical direction, thereby eliminating a fear that the winding shape of the magnetic tape can be in disorder. Accordingly, a good winding shape of the magnetic tape can be obtained over the entire areas on and between the upper and lower flanges 142, 143.

Also, in case where the width W of the two flat surfaces 142c, 143c is in the range of 0.5–5.0 mm and the clearance H between the two flat surfaces 142c, 143c is in the range of 6.6 m–6.8 mm, a good winding shape can be obtained.

By the way, the second invention is not limited to the above-mentioned embodiment but various changes and improvements are possible without departing from the subject matter of the second invention. For example, the second invention is not limited to the DVC but can also be applied to any type of magnetic tape cassette.

As described above, according to the second invention, on the respective portions of the upper and lower flanges that are situated adjacently to their associated hubs, there are formed the flat surfaces that intersect with the side surfaces of the hubs at right angles and have a given width in the radial direction of the respective flanges; and, therefore, during the initial winding time while the magnetic tape is wound between the two flat surfaces of the upper and lower flanges, the side edges of the magnetic tape are defined by the two flat surfaces, thereby eliminating a fear that the magnetic tape can be vibrated in the vertical direction. Thanks to this, the winding surface of the magnetic tape, which is formed by the side edges of the magnetic tape, can be formed as a flat surface, thereby being able to provide a good winding shape of the magnetic tape.

Next, description will be given below of an embodiment according to a third invention. Here, FIG. 7 is a plan view of a lower cassette half of a magnetic tape cassette according to a first embodiment of the third invention; and, FIG. 8 is a section view of the main portions of the magnetic tape cassette shown in FIG. 7.

Figure 7:
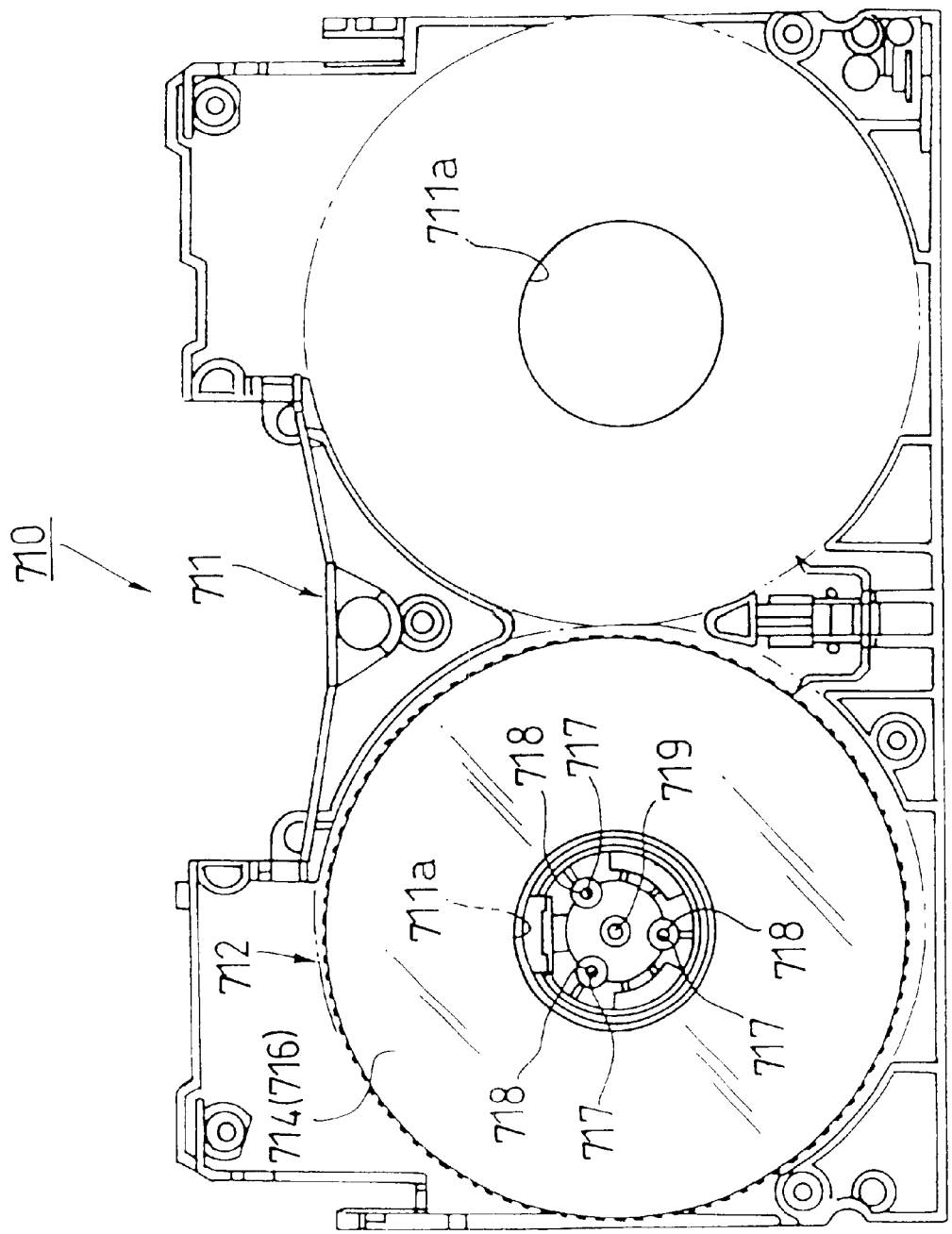
FIG. 7 is a plan view of a lower cassette half of a magnetic tape cassette according to a first embodiment of the third invention.
Figure 8:
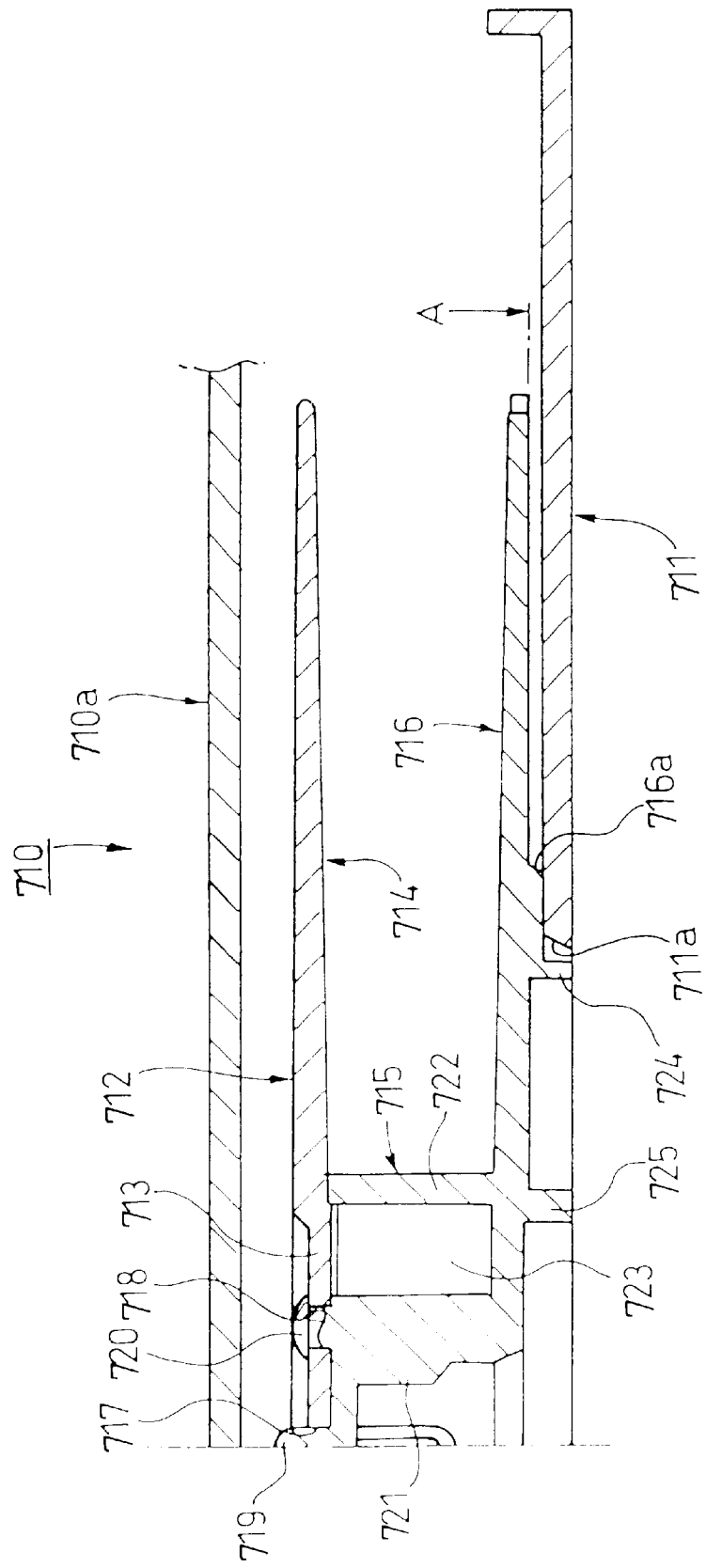
FIG. 8 is a section view of the main portions of the magnetic tape cassette shown in FIG. 7.

In FIG. 7, a magnetic tape cassette 710 is structured such that a pair of tape reels 712 (in FIG. 7, a tape reel to be disposed on the right side is not shown) with a magnetic tape t (see FIG. 20) are rotatably supported on a lower cassette half 711 which makes a pair with an upper cassette half 710a (see FIG. 8).

The lower cassette half 711 is integrally molded of synthetic resin such as ABS resin and includes a pair of right and left (in FIG. 7) reel holes 711a. Referring to use of the respective reel holes 711a of the lower cassette half 711, in a state where the magnetic tape cassette 710 is loaded into a drive apparatus (not shown), the tape reel drive portion (not shown) of the drive apparatus can be inserted into and removed from the reel holes 711a.

Referring to FIGS. 7 and 8, each of the tape reels 712 of the magnetic tape cassette 710 comprises an upper flange 714, and a lower flange 716 disposed opposed to the upper flange 714 and including a hub 715 on the surface thereof opposed to the central portion 713 of the upper lange 714.

The upper and lower flanges 714 and 716 are fixed in such a manner that the upper surface of the hub 715 of the lower flange 716 is contacted with the lower surface of the central portion 713 of the upper flange 714. The upper flange 714 is integrally molded of, for example, transparent synthetic resin, whereas the lower flange 716 is integrally molded of, for example, opaque synthetic resin.

In the upper flange 714, there are formed a pivot hole 717 and a welding boss hole 718. The pivot hole 717 is formed so as to penetrate through the substantially central position of the central portion 713 of the upper flange 714. In the case of the welding boss hole 718, at the positions in the central portion 713 of the upper flange 714 that correspond to welding bosses 720 (which will be discussed later), the same number of welding boss holes 718 as the welding bosses 720 are formed so as to penetrate through the central portion 713 of the upper flange 714.

In the case of the lower flange 716, on the upper surface of the hub 715 thereof, there are projectingly provided a pivot 719 and a welding boss 720. Referring to the structure of the hub 715, on the periphery of the hub 715 that is distant in the radial direction from the hub central portion 721, there is formed a side wall 722 serving as the winding surface of the magnetic tape t, while the hub central portion 721 and side wall 722 are connected together by a plurality of ribs 723.

The pivot 719 is provided on and projected from the substantially central position of the upper surface of the hub central portion 721. Also, in the case of the welding boss 720, two or more units of the welding boss 720 are provided on and projected from the upper surface of the hub central portion 721 (in the present embodiment, one unit of the welding boss 720 is projectingly provided every 120° in the peripheral direction with the pivot 719 as the center thereof, that is, a total of three units of the welding boss 720 are provided).

In each of the tape reels 712, the pivot 719 projectingly provided on the hub 715 of the lower flange 716 is fitted into the pivot hole 717 formed in the flange portion 713 of the upper flange 714. Also, the welding bosses 720 projectingly provided on the hub 715 of the lower flange 716 are respectively fitted into their associated welding boss holes 718 formed in the central portion of the upper flange 714.

In the thus fitted state, in case where the welding horns (not shown) are respectively contacted with the substantially central portions of the leading end faces (in FIG. 8, the upper end faces) of the welding bosses 720, the respective welding bosses 720 can be welded supersonically. Thanks to this, the upper and lower flanges 714 and 716 can be fixed with a given position relationship between them.

On the bottom surface of the lower flange 716 that exists on the opposite side to the hub 715, not only there is disposed an outside annular-shaped rib 724 but also, inwardly of the outside annular-shaped rib 724 in the radial direction of the lower flange 716, there is provided an inside annular-shaped rib 725. The outside annular-shaped rib 724 and inside annular-shaped rib 725 are present at positions more distant by a given amount in the radial direction from the pivot 719 than the welding bosses 720:

The outside annular-shaped rib 724 has an outside diameter smaller by a given amount than the inside diameter of the reel hole 711a of the lower cassette half 711 and can be loosely fitted into the reel hole 711a.

Referring further to the lower flange 716, its large-thickness stepped portion 716a formed to be continuous with the outside annular-shaped rib 724, which is disposed opposed to the edge portion of the reel hole 711a of the lower cassette half 711, has a thickness of a given value or larger and thus, when compared with the remaining portions of the lower flange 716, the large-thickness stepped portion 716a projects slightly downward in FIG. 8.

The large-thickness stepped portion 716a of the lower flange 716 not only allows the lower flange 716 to have high rigidity but also, when the magnetic tape cassette 710 is not loaded into a drive apparatus (not shown), that is, when it is not in use, allows the tape reel 712 to be supported by the lower cassette half 711.

Now, description will be given below of the operation of the present embodiment.

When the magnetic tape cassette 710 is not loaded into a drive apparatus (not shown), that is, when it is not in use, the large-thickness stepped portions 716a of the lower flanges 716 of the tape reels 712 are respectively contacted with the edge portions of the reel holes 711a formed in the inner surface of the lower cassette half 711.

In this state, not only entry of dust into the interior of the magnetic tape cassette 710 can be prevented but also the high dust-proof property of the magnetic tape cassette 710 can be secured.

Also, the tape reels 712 and the magnetic tape t wound around the tape reels 712 are supported through the large-thickness stepped portions 716a of the lower flanges 716 on the lower cassette half 711. Thanks to the support of the tape reels 712 on the lower cassette half 711 through the large-thickness stepped portions 716a of the lower flanges 716 as well as thanks to the high rigidity of the lower flanges 716 of the tape reels 712 due to provision of the large-thickness stepped portions 716a, even in the case of a tape reel having a large diameter size, there can be prevented positively the deformation of the lower flanges 16 of the tape reels 712 due to the weight of the magnetic tape t when the magnetic tape cassette 710 is not in use. This makes it possible to secure a sufficient clearance A between the lower flanges 716 and lower cassette half 711.

Figure 9:
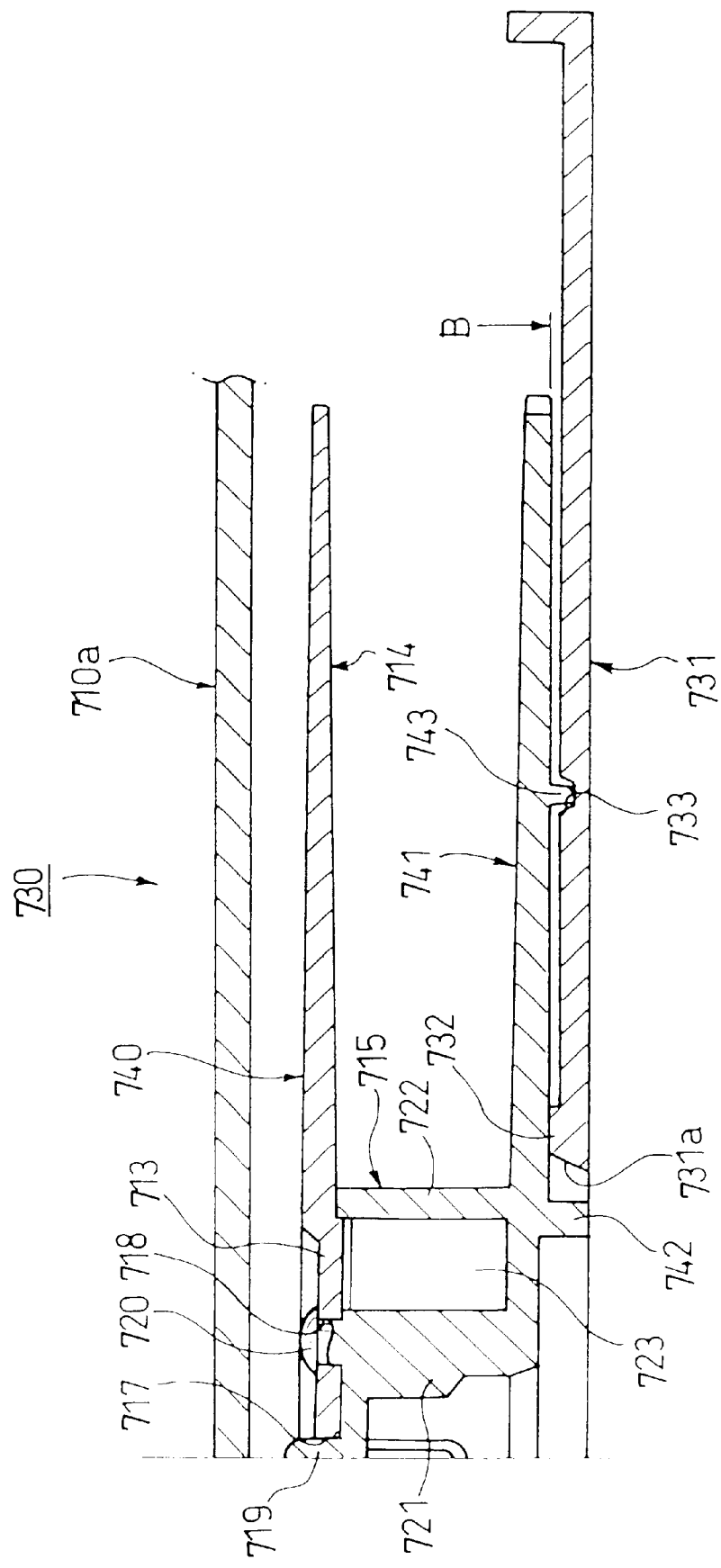
FIG. 9 is a section view of the main portions of a magnetic tape cassette according to a second embodiment of the third invention.

Next, description will be given below of an embodiment according to a fourth invention. FIG. 9 is a section view of the main portions of a magnetic tape cassette according to an embodiment of the fourth invention.

In a magnetic tape cassette 730 according to the present embodiment, on the edge portions of reel holes 731a formed in the inner surface (in FIG. 9, the upper surface) of a lower cassette half 731, there are provided annular-shaped projecting portions 732 respectively. The annular-shaped projecting portions 732, when the magnetic tape cassette 730 is not in use, are respectively contacted with the outer surfaces of the lower flanges 741 of tape reels 740. Due to such contact, the annular-shaped projecting portions 732 not only can prevent dust from entering the interior of the magnetic tape cassette 730 but also can support the weight of the tape reels 740 and the weight of a magnetic tape t (see FIG. 20) wound around the tape reels 740.

Also, in the lower flanges 741 of the tape reels 740, the large-thickness portion 716a (see FIG. 8) is not formed. On the radial-direction inside (in FIG. 9, the left side) portions of the edge portions of the reel holes 731a formed in the outer surfaces (in FIG. 9, lower surfaces) of the lower flanges 741 of the tape reels 740, there are provided annular-shaped ribs 742 respectively. The annular-shaped ribs 742 respectively have an outside diameter smaller by a given amount than the inside diameter of the reel holes 731a of the lower cassette half 731 and thus can be loosely fitted into their associated reel holes 731a.

Further, on the radial-direction outside (in FIG. 9, the right side) of the annular-shaped ribs 742 provided on the lower flanges 741 of the tape reels 740, there are provided annular-shaped projections 743 respectively. The annular-shaped projections 743, when the magnetic tape cassette 730 is not in use, are loosely fitted respectively with their associated annular-shaped recessed portions 733 formed in the inner surface of the lower cassette half 731 and are thus contacted with the lower cassette half 731. Due to this, the annular-shaped projections 743 are able to support the weight of the tape reels 740 and also the weight of the magnetic tape t wound around the tape reels 740.

The remaining portions of the present embodiment are similar in structure to the previously-described embodiment of the third invention.

Now, description will be given below of the operation of the present embodiment.

When the magnetic tape cassette 730 is not in use, not only the annular-shaped projecting portions 732 of the lower cassette half 731 are respectively contacted with the mutually opposed outer surfaces of the lower flanges 741 of the tape reels 740 but also the annular-shaped projections 743 of the lower flanges 741 are respectively fitted loosely into their associated annular-shaped recessed portions 733 of the lower cassette half 731 and are thus contacted with the lower cassette half 731.

In this state, entry of dust into the interior of the magnetic tape cassette 730 can be prevented as well as the high dust-proof property of the magnetic tape cassette 730 can be secured.

Also, the tape reels 740 and the magnetic tape t wound around the tape reels 740 are supported on the lower half cassette 731 through the annular-shaped projecting portions 732 of the lower cassette half 731 and the annular-shaped projections 743 of the lower flanges 741. Thanks to the support of the tape reels 740 on the lower cassette half 731 through the annular-shaped projecting portions 732 of the lower cassette half 731 and the annular-shaped projections 743 of the lower flanges 741, even in the case of tape reels each having a large diameter size, the deformation of the lower flanges 741 of the tape reels 740 due to the weight of the magnetic tape t can be prevented positively. This makes it possible to secure a sufficient clearance B between the lower flanges 741 and lower cassette half 731.

As described above, according to the previously-described embodiment of the third invention, in the lower flanges 716 of the respective tape reels 740, there are formed the large-thickness stepped portions 716a which, when the magnetic tape cassette 710 is not in use, are contacted with the edge portions of the reel holes 711a formed in the inner surface of the lower cassette half 711. Therefore, entry of dust into the interior of the magnetic tape cassette 710 can be prevented as well as the high dust-proof property of the magnetic tape cassette 710 can be secured.

Also, thanks to the support of the tape reels 712 on the lower cassette half 711 through the large-thickness stepped portions 716a of the lower flanges 716 as well as thanks to the high rigidity of the lower flanges 716 of the tape reels 712 due to provision of the large-thickness stepped portions 716a, even in the case of tape reels each having a large diameter size, there can be prevented positively the deformation of the lower flanges 16 of the tape reels 712 due to the weight of the magnetic tape t when the magnetic tape cassette 710 is not in use. This makes it possible to secure a sufficient clearance A between the lower flanges 716 and lower cassette half 711.

According to the above-mentioned embodiment of the fourth invention, in the edge portions of the reel holes 731a formed in the inner surfaces of the lower cassette half 731, there are respectively provided the annular-shaped projecting portions 732 which, when the magnetic tape cassette 730 is not in use, are contacted with the outer surfaces of the lower flanges 741 of the tape reels 740. Therefore, entry of dust into the interior of the magnetic tape cassette 730 can be prevented as well as the high dust-proof property of the magnetic tape cassette 730 can be secured.

Also, the annular-shaped projections 743, which can be loosely fitted into their associated annular-shaped recessed portions 733 formed in the inner surface of the lower cassette half 731 when the magnetic tape cassette 730 is not in use, are respectively provided on the radial-direction outside of the annular-shaped ribs 742 disposed on the lower flanges 741 of the tape reels 740.

Therefore, when the magnetic tape cassette 730 is not in use, the weight of the tape reels 740 and the weight of the magnetic tape t wound around the tape reels 740 can be supported by the lower cassette half 731 through the annular-shaped projecting portions 732 of the lower cassette half 731 and the annular-shaped projections 743 of the lower flanges 741. Thanks to this, even in the case of tape reels each having a large diameter size, the deformation of the lower flanges 741 of the tape reels 740 due to the weight of the magnetic tape t when the magnetic tape cassette 730 is not in use can be prevented positively, thereby being able to secure a sufficient clearance B between the lower flanges 741 and lower cassette half 731.

As described above, according to the third invention, the lower flange of each tape reel has a large-thickness stepped portion is formed to be continuous with an outside annular-shaped rib, while the large-thickness stepped portion includes a portion which is disposed opposed to the edge portion of its associated reel hole of the lower cassette half and the thickness of which is set at a given value or larger.

Therefore, not only, when the magnetic tape cassette 730 is not in use, high dust-proof property can be secured in the interior of the magnetic tape cassette 730, but also the deformation of the lower flanges of the tape reels can be prevented positively to thereby be able to secure a sufficient clearance between the lower flanges and lower cassette half.

Also, according to the fourth invention, on the edge portions of the reel holes formed in the inner surface of the lower cassette half, there are disposed not only the annular-shaped projecting portions but also the annular-shaped recessed portions on the radial-direction outside of the annular-shaped projection portions, and, at the positions in the inner surfaces of the lower flanges of the tape reels that are opposed to the annular-shaped recessed portions, there are disposed the annular-shaped projections which can be loosely fitted into the annular-shaped recessed portions.

Therefore, not only, when the magnetic tape cassette is not in use, high dust-proof property can be secured in the interior of the magnetic tape cassette, but also the deformation of the lower flanges of the tape reels can be prevented positively to thereby be able to secure a sufficient clearance between the lower flanges and lower cassette half.

Figure 10:
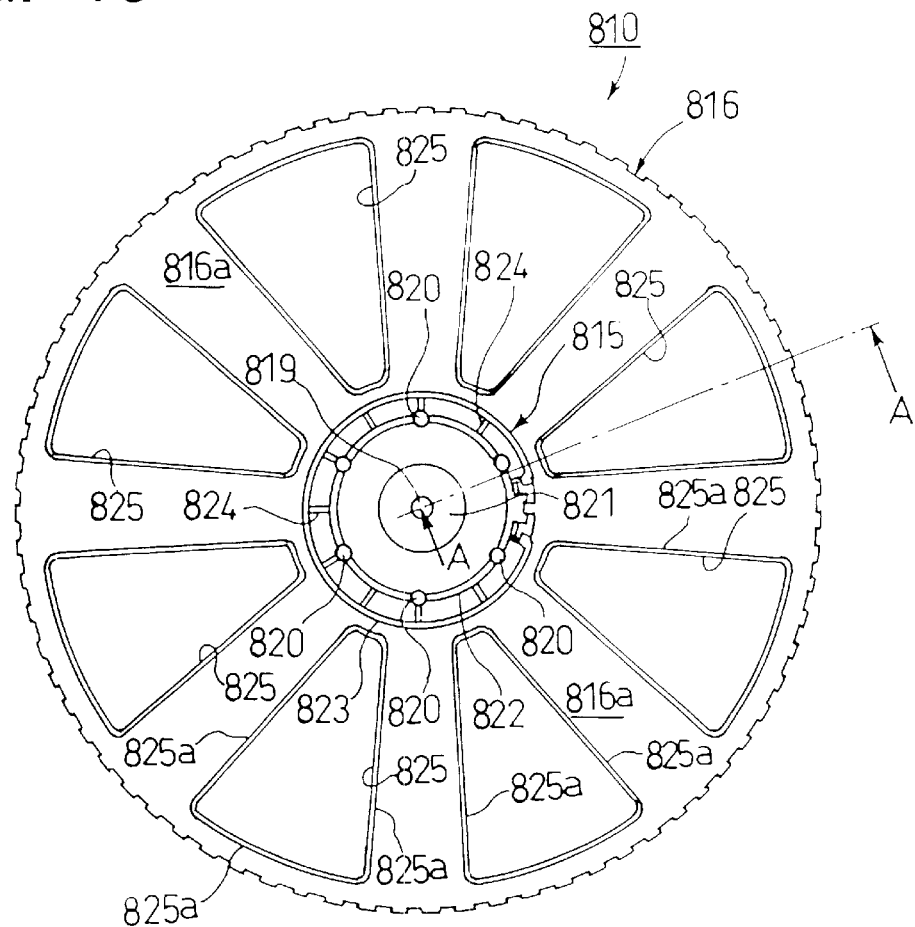
FIG. 10 is a plan view of a lower flange of a tape reel of a magnetic tape cassette according to an embodiment of the fourth invention.
Figure 11:
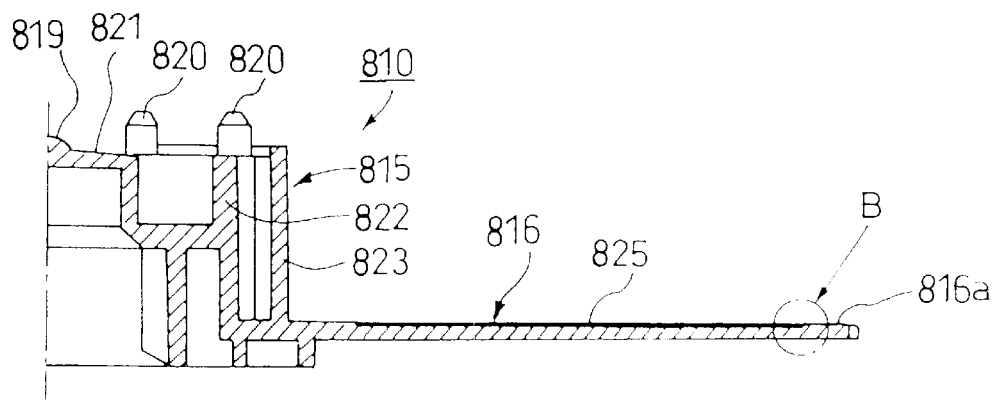
FIG. 11 is a section view of the lower flange shown in FIG. 10, taken along the arrow line A—A in FIG. 10.
Figure 12:
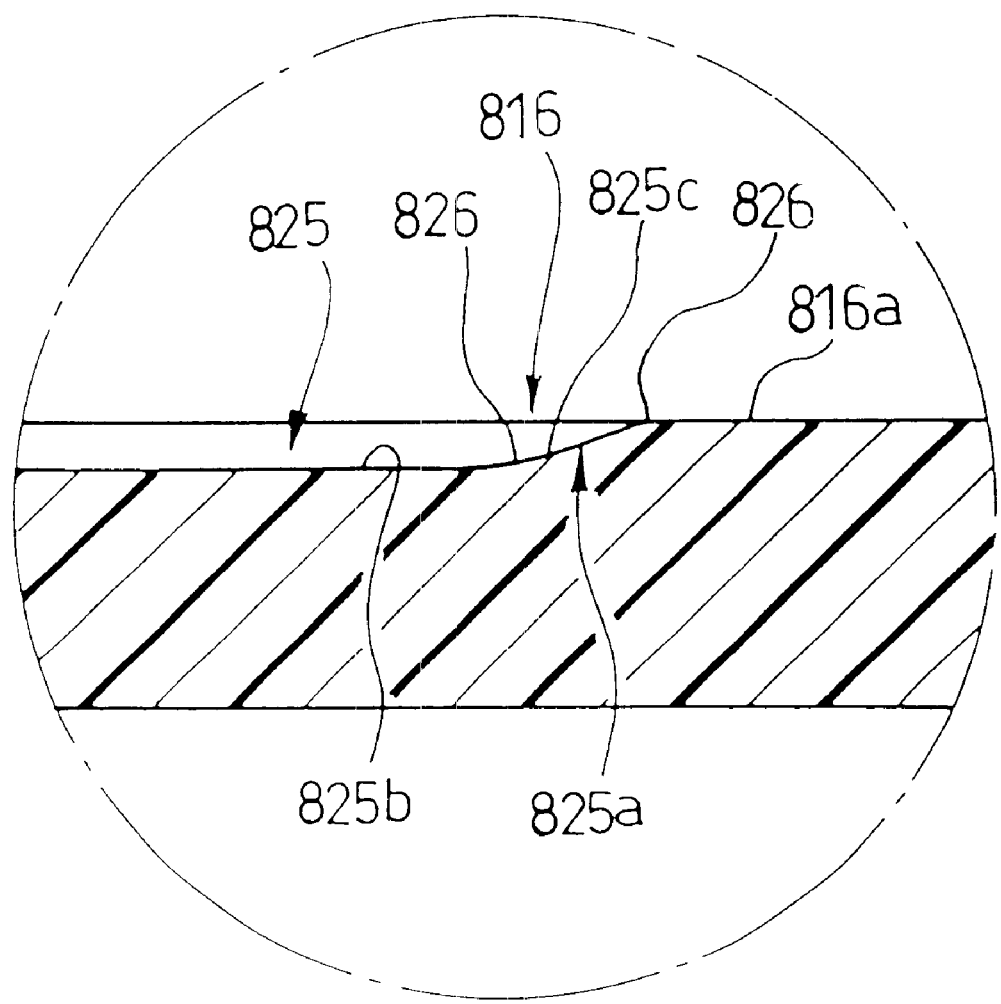
FIG. 12 is an enlarged section view of the B portion of the lower flange shown in FIG. 11.

Next, description will be given below of an embodiment according to a fifth invention. Here, FIG. 10 is a plan view of a lower flange of a tape reel of a magnetic tape cassette according to an embodiment of the fifth invention; FIG. 11 is a section view of the lower flange shown in FIG. 10, taken along the arrow line A—A in FIG. 10; and, FIG. 12 is an enlarged section view of the B portion of the lower flange shown in FIG. 11.

Firstly, the whole structure of a magnetic tape cassette according to the present embodiment will be described below with reference to FIG. 24. The present magnetic tape cassette is structured such that a pair of tape reels 810 around which a magnetic tape t can be wound are rotatably supported on a lower cassette half 812 making a pair with an upper cassette half 811.

Referring now to FIGS. 10 and 11, each tape reel 810 comprises an upper flange 814 (see FIG. 24) including a central portion 813 (see FIG. 24), and a lower flange 816 disposed opposed to the upper flange 814 and including a hub 815 provided on the surface thereof opposed to the upper flange 814. The upper flange 814 and lower flange 816 are fixed with a given clearance between them. The upper flange 814 is integrally molded of, for example, transparent synthetic resin, whereas the lower flange 816 is integrally molded of, for example, opaque synthetic resin.

Figure 24:
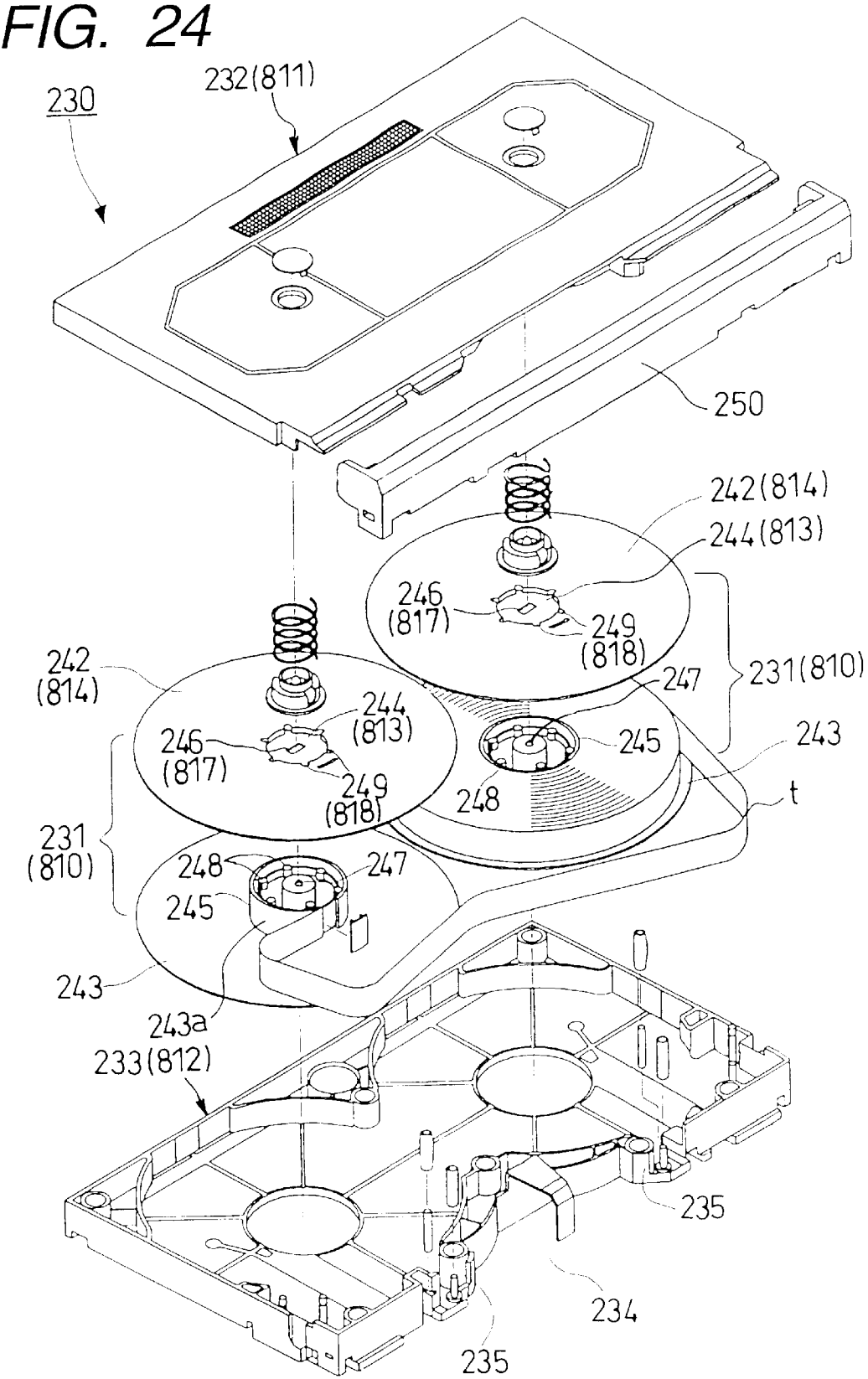
FIG. 24 is an exploded perspective view of a conventional magnetic tape cassette (beta cam)
Figure 25:
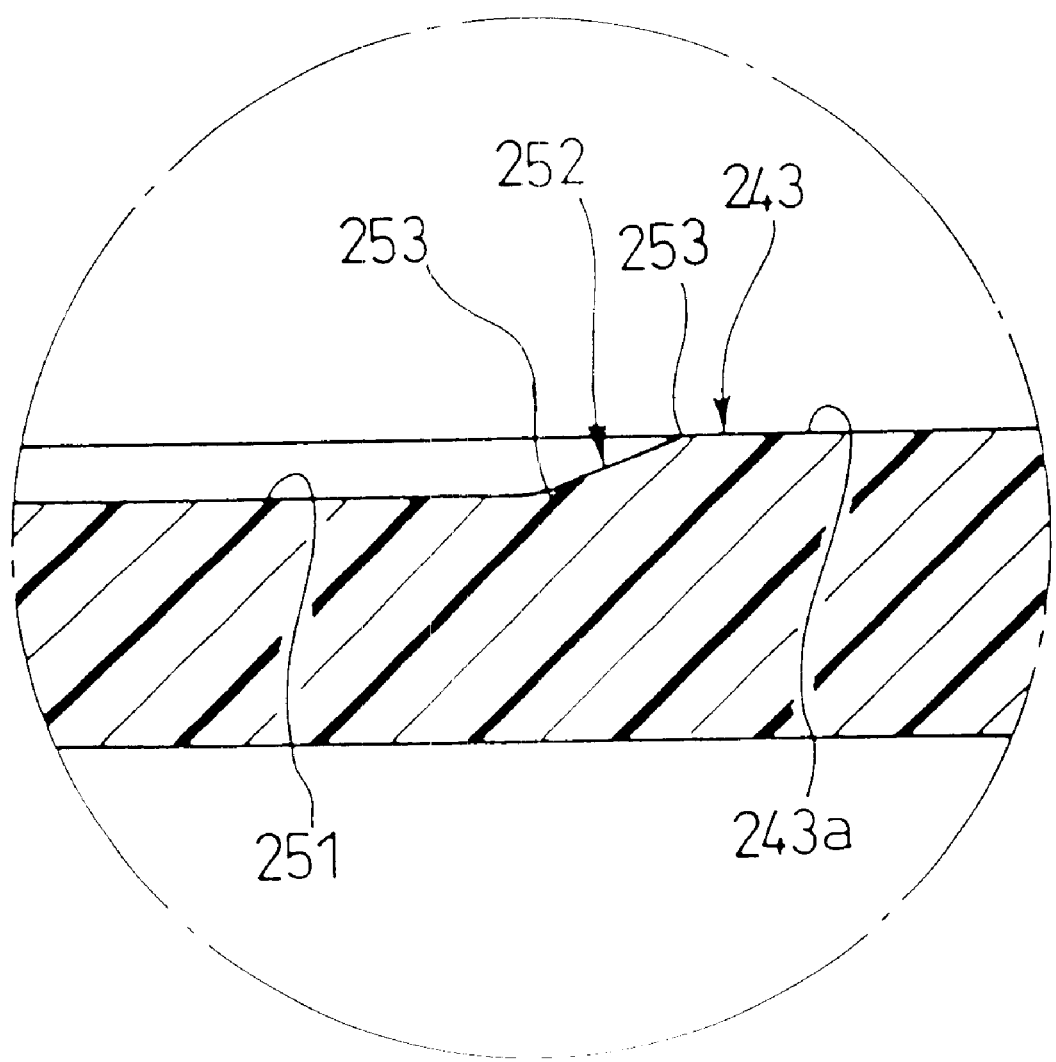
FIG. 25 is an enlarged section view of the main portions of a lower flange of a tape reel used in the magnetic tape cassette shown in FIG. 24.
Figure 26A:
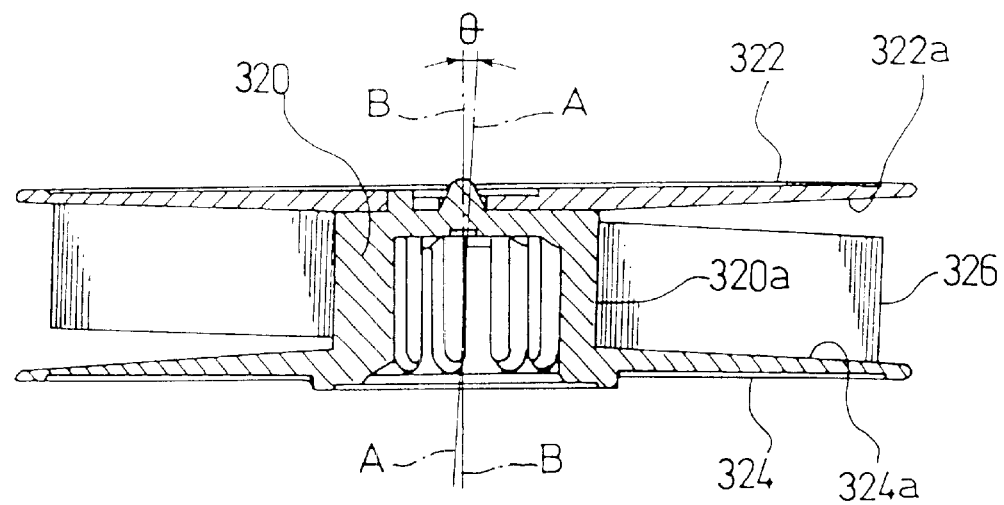
FIG. 26($a$) is a section view of a conventional magnetic tape reel, and FIG. 26($b$) is a schematic side view of a hub.
Figure 26B:
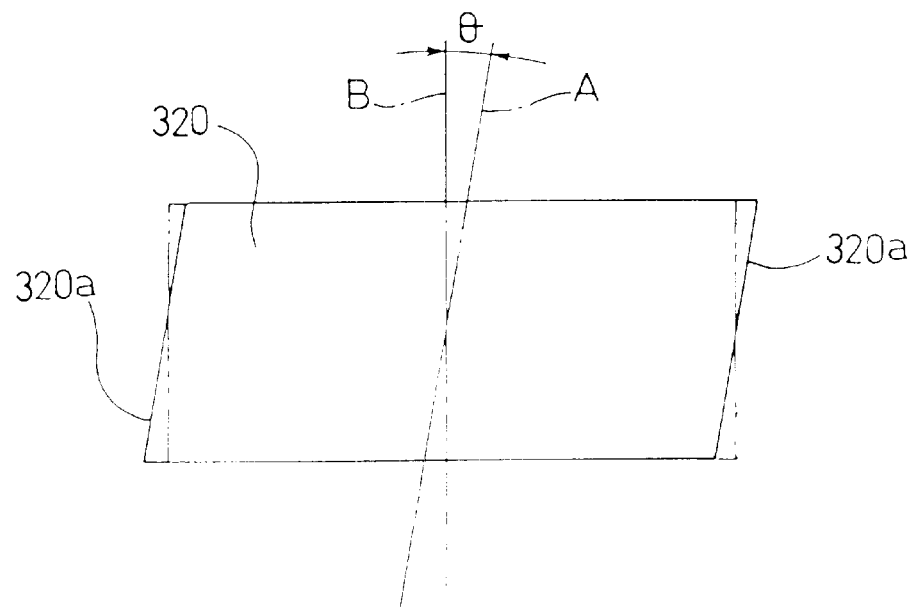
Figure 27:
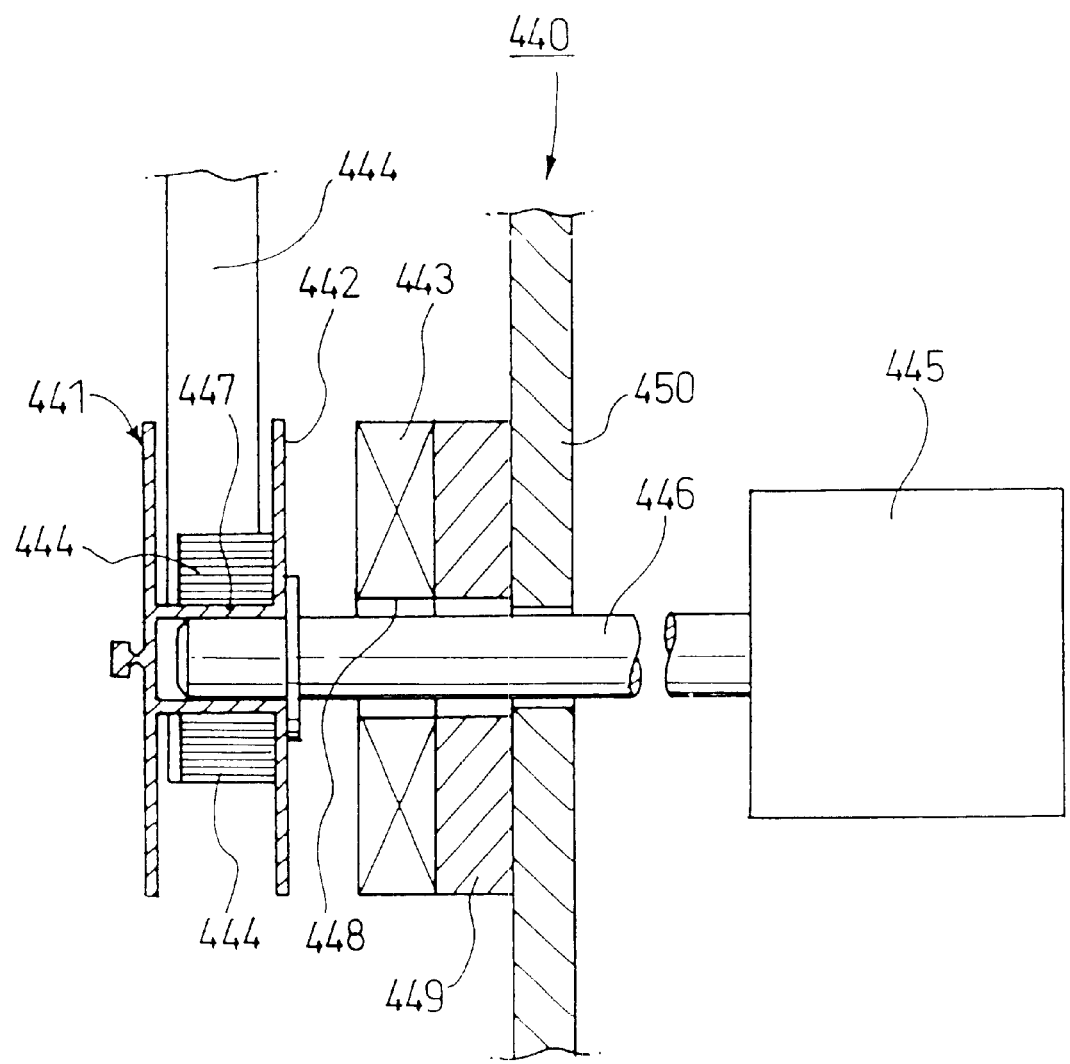
FIG. 27 is a schematic section view of the main portions of a conventional magnetic tape take-up apparatus; and, FIG. 28 is a schematic side view of the main portions of a recording and reproducing apparatus for recording and reproducing a magnetic tape cassette.

In the upper flange 814, there are formed a pivot hole 817 (see FIG. 24) and welding boss holes 818 (see FIG. 24). The pivot hole 817 is formed substantially centrally in the central portion 813 of the upper flange 814 so as to penetrate through the upper flange 814. The welding boss holes 818 are formed at the positions in the central portion 813 of the upper flange 814 that respectively correspond to their associated welding bosses 820 (which will be discussed later), while the number of the welding boss holes 818 is set equal to that of the welding bosses 820.

In the case of the lower flange 816, a pivot 819 and welding bosses 820 are respectively provided on and projected from the upper surface of the hub 815. That is, the hub 815 is structured such that, in the periphery of the hub 815 distant radially from the central portion 821 of the hub 815, there is formed an inner side wall 822; and also, in the portion of the periphery of the hub 815 that is further distant radially than the inner side wall 822, there is formed an outer side wall 823 serving as a winding surface for a magnetic tape t (see FIG. 24). The inner and outer side walls 822 and 823 are connected together by a plurality of ribs 824 which are disposed along the radial direction of the hub 815.

The pivot 819 is provided on and projected from the substantially central position of the upper surface of the hub central portion 821. In the case of the welding bosses 820, at the positions of the upper surface of the inner side wall 822 that are distant in the radial direction of the hub 815 from the pivot 819, there are two or more units of the welding bosses 820 such that they are spaced from each other at given intervals in the peripheral direction of the inner side wall 822. The ribs 824 are respectively interposed between the side surface of the inner side wall 822 and the inner surface of the outer side wall 823 that is disposed opposite thereto in the radial direction of the hub 815.

In each tape reel 810, the pivot 819 projectingly provided on the hub 815 of the lower flange 816 is fitted into the pivot hole 817 formed in the central portion of the upper flange 814. Also, the welding bosses 820 projectingly provided on the hub 815 of the lower flange 815 are respectively fitted into their associated welding boss holes 818 formed in the central portion 813 of the upper flange 814.

In this state, in case where welding horns (not shown) are contacted with the substantially central portions of the leading end face (in FIG. 11, the substantially central portions of the upper end face) of the respective welding bosses 820, the welding bosses 820 can be welded supersonically. Thanks to this, the upper and lower flanges 814 and 816 can be fixed with a given position relationship between them.

Referring now to FIGS. 10–12, in the surface 816a (in FIG. 11, the upper surface) of the lower flange 816 that is opposed to the upper flange 814, there can be formed a plurality of air discharging recessed portions 825 at given intervals in the peripheral direction of the lower flange 816 when the lower flange 816 is worked or molded using a metal mold. The air discharging recessed portions 825, when they are viewed from the top surfaces thereof, are respectively formed in a substantially fan-like shape fanning out outwardly in the radial direction of the lower flange 816, while they respectively have a depth of, for example, 0.2 mm. The air discharging recessed portions 825 are respectively used to discharge the air that enters together with the magnetic tape t as the magnetic tape t is wound around the tape reels.

In the respective edge portions 825a of the air discharging recessed portions 825, there are formed sloping surfaces 825c which are used to connect the bottom surfaces 825b of the air discharging recessed portions 825 with the upper surface (in FIG. 11) of the lower flange 816. On the boundary portions between the bottom surfaces 825b and sloping surfaces 825c of the air discharging recessed portions 825 as well as on the boundary portions between the upper surface (in FIG. 11) of the lower flange 816 and the sloping surfaces 825c of the air discharging recessed portions 825, there are applied required curved shapes 826 over the entire peripheries of the air discharging recessed portions 825, respectively, so that no edge can be produced in the above boundary portions. By the way, not only in the magnetic tape cassette for a beta cam to be described in the present embodiment, but also in any other magnetic tape cassette, the R (curved) shape 826 may preferably have a diameter in the range of 1 mm to 4 mm (R1 to R4).

By the way, the air discharging recessed portions 825 may be respectively formed as air discharging penetration holes (not shown) which penetrate through the lower flange 816. Also, although the required curved shapes 826 may be preferably applied over the entire peripheries of the air discharging recessed portions 825, since it is believed that the magnetic tape t can be damaged extremely often by the edge portions of at least two sides (the boundary portions between the upper surface 816a of the lower flange 816 and the sloping surfaces 825c) of the air discharging recessed portions 825 in the flange radial direction, the curved shapes 826 maybe applied to at least such two sides of the respective air discharging recessed portions 825.

Now, description will be given below of the operation of the present embodiment.

When the magnetic tape t is taken up around the tape reels of the magnetic tape cassette, the air discharging recessed portions 825 of the lower flange 816 function as flow passages which discharge the accompanying air externally of the tape reels, thereby being able to prevent the magnetic tape t from being wound in disorder. In this case, even in case where the magnetic tape t is contacted with the edge portions 825a of the air discharging recessed portions 825 of the lower flange 816, the required curve shapes 826 applied to the edge portions 825a can eliminate the fear that the magnetic tape t can be damaged by the edge portions 825a.

As described above, according to the present embodiment, on the boundary portions between the bottom surfaces 825b and sloping surfaces 825c of the air discharging recessed portions 825 of the lower flange 816 as well as on the boundary portions between the upper surface 816a (in FIG. 11) of the lower flange 816 and the sloping surfaces 825c of the air discharging recessed portions 825, there are applied the required curve shapes 826, respectively. Due to this, the damage of the magnetic tape t otherwise possibly caused by its contact with the lower flanges 816 of the tape reels can be prevented. Thanks to this, the present embodiment is able to cope with the enhanced density of the magnetic tape recording.

As described above, according to the fifth invention, on the edge portions of at least two flange-radial-direction sides of the air discharging recessed portions or air discharging penetration holes formed in the upper or lower flange, there are applied the required curve shapes respectively.

Therefore, the damage of the magnetic tape due to its contact with the tape reels can be prevented. Due to this, the fifth invention is able to cope with the enhanced density of the magnetic tape recording.

Figure 13:
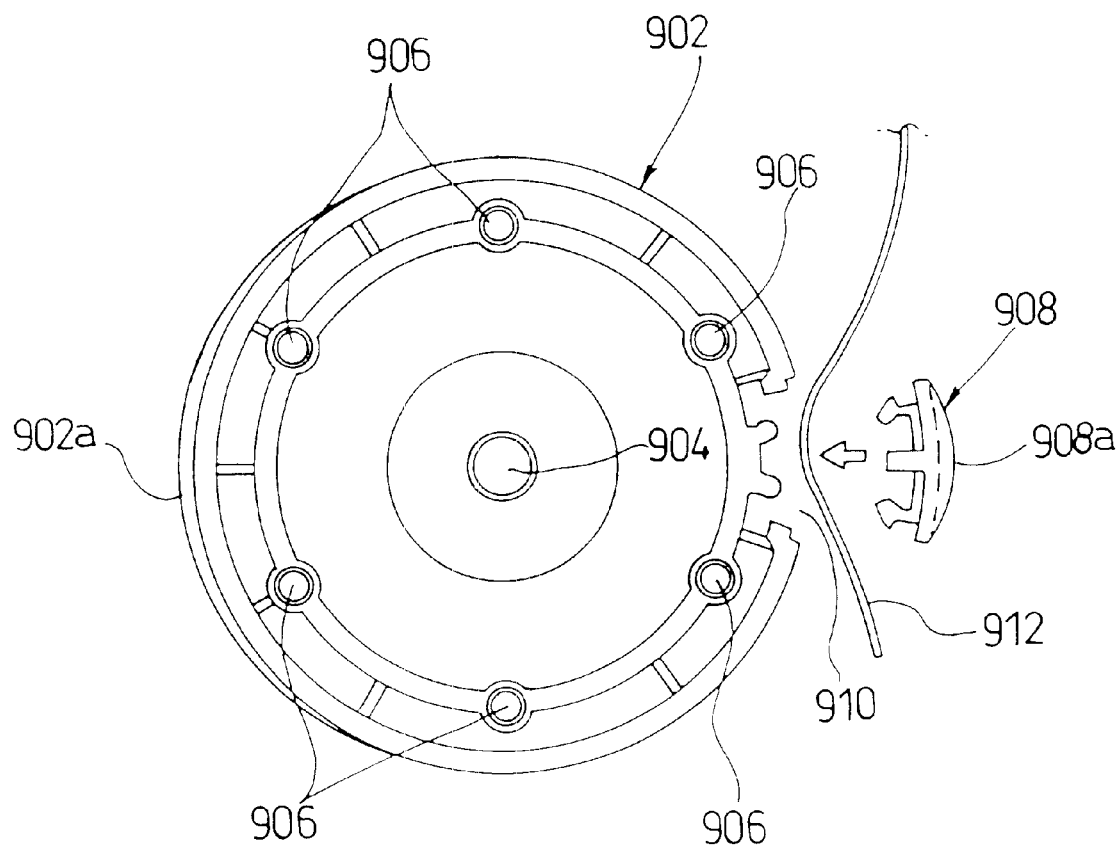
FIG. 13 is an exploded plan view of a hub and a clamp member included in a magnetic tape reel according to an embodiment of the fifth invention.
Figure 14A:
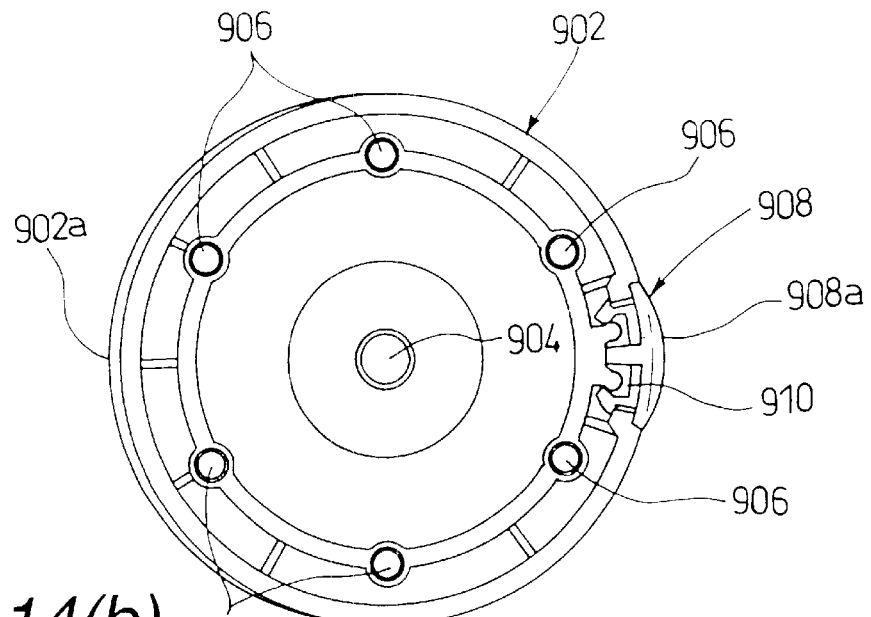
FIG. 14($a$) is a plan view of the hub and clamp member included in the magnetic tape reel according to the embodiment of the fifth invention, showing their combined state, and FIG. 14($b$) is a side view thereof.
Figure 14B:
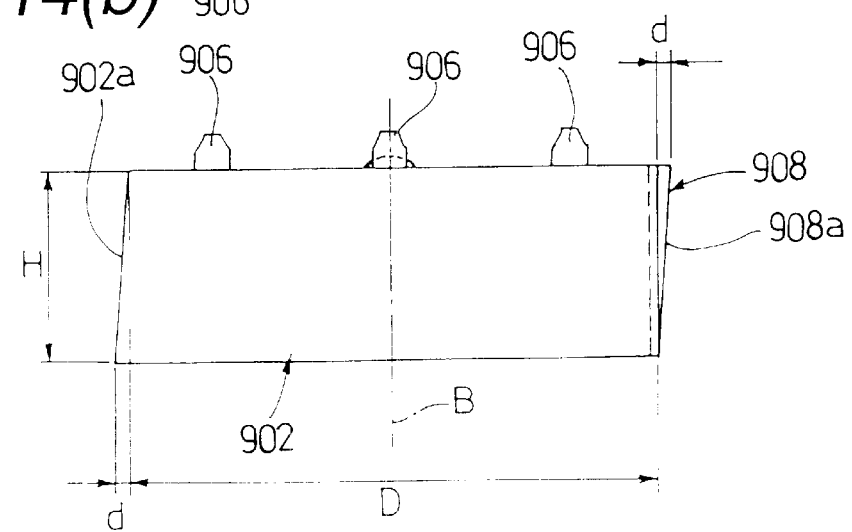

Next, description will be given below in detail of an embodiment according to sixth and seventh inventions. FIG. 13 is an exploded plan view of a hub and a clamp member included in a magnetic tape reel of a beta cam L cassette according to an embodiment of the fifth invention. And, FIG. 14(a) is a plan view of the hub and clamp member included in the magnetic tape reel according to the embodiment of the fifth invention, showing their combined state, and FIG. 14(b) is a side view thereof. By the way, the magnetic tape reel includes two flanges on the upper and lower portions of the hub but, in FIGS. 13 and 14, the illustration of these flanges is omitted.

On the central portion of the upper surface of the hub 902, there is disposed a rib 904 which can be pressed by a reel holder within the beta cam L cassette; and, in the radial direction of the upper surface of the hub 902, there are disposed a plurality of welding ribs 906 which can be supersonically welded to the upper flange. Also, in the peripheral surface of the hub 902, there is formed a recessed portion 912 which is used to hold and fix the other end of a leader tape 912, with one end thereof connected to the magnetic tape, using a clamp member 908. In case where the clamp member 908 is fitted into the recessed portion 910, the clamp member 908 holds and fixes the leader tape 912.

Referring to the structure of the hub 902, the peripheral surface 902a of the left (in FIG. 13) half section thereof is formed as a sloping surface which increases in diameter as it goes downward and approaches the portion (in FIG. 13, the left end portion) thereof opposed to the recessed portion 910. Also, the peripheral surface of the right (in FIG. 13) half section of the hub 902 is formed as a half-cylindrical shape, and the present peripheral surface does not slope but is parallel to the axial direction B of the hub 902. A difference d between the lower portion of the sloping surface and the upper portion of the sloping portion, preferably, may be in the range of 0.1–0.5 mm. In the case of the present embodiment, the difference d between the lower portion of the sloping surface and the upper portion of the sloping portion is set at 0.4 mm. By the way, the height H of the hub 902 is set at 13.5 mm, while the diameter D of the hub excluding the sloping surface is set at 36 mm.

On the other hand, the peripheral surface 908a of the clamp member 908 is formed as a sloping surface which increases in diameter as it goes toward the upper portion thereof and, when it is viewed from the top surface thereof, approaches the center (in FIG. 14(a), the right end) of the recessed portion 910. The inner surface of the clamp member 908 is formed so as to be parallel to the axial direction B of the hub 902. And, as shown in FIG. 14(b), the sloping peripheral surface 902a of the hub 902 and the sloping peripheral surface 908a of the clamp member 908 are parallel to each other when they are viewed from the side surfaces thereof.

According to the present structure, similarly to the tape reel disclosed in the previously cited Japanese Utility Model Unexamined Publication No. Sho.58-187083, since a magnetic tape to be wound around the hub 902 is contacted with either the upper flange or lower flange every 180° when it is viewed from the top surface thereof so that the movement thereof in the vertical direction is restricted, there is no possibility that the magnetic tape wound around the hub 902 can project in part in the axial direction B of the hub 902.

According to the present embodiment, since the hub 902 is structured such that only the peripheral surface 902a of the left half section thereof slopes, after molded, the hub 902 can be pulled out as it is in the axial direction B; that is, the hub 902 can be molded without complicating a metal mold. Also, similarly, since the clamp member 908 is structured such that only the peripheral surface 908a slopes, the clamp member 908 can be molded without complicating a metal mold.

Figure 15A:
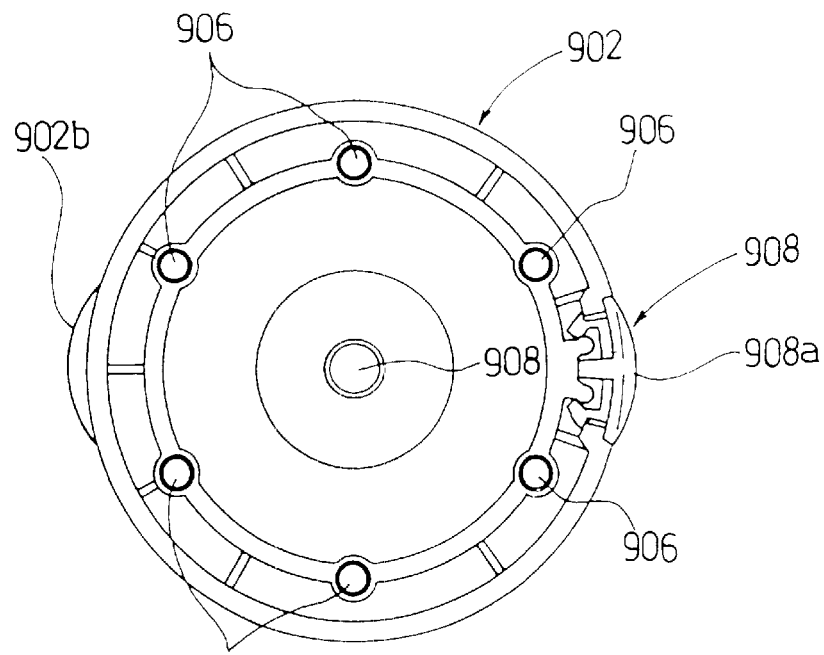
FIG. 15($a$) is a plan view of a hub and a clamp member included in a magnetic tape reel according to another embodiment of the fifth invention, showing their combined state, and FIG. 15($b$) is a side view thereof.
Figure 15B:
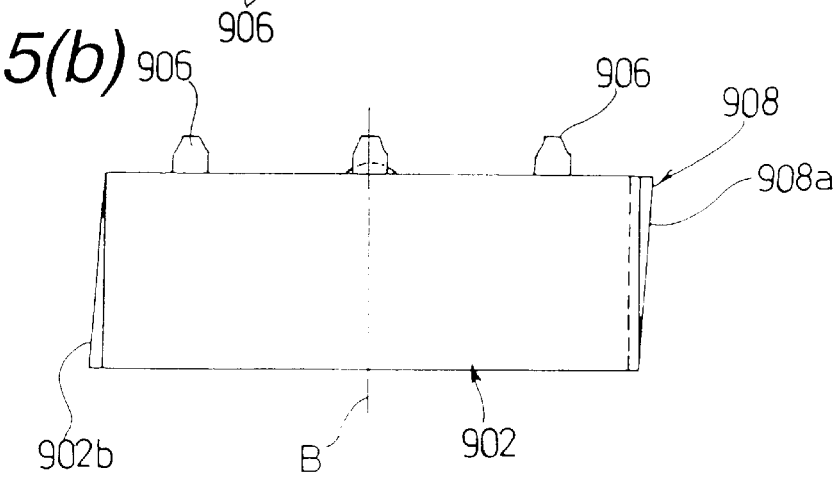

By the way, in the present embodiment, the entire area of the peripheral surface 902a of the left (in FIG. 14) half section of the hub 902 is formed as a sloping surface increasing in diameter toward the portion that is opposed 180° to the recessed portion; however, as shown in FIG. 15, only the neighboring portion 902b of the portion opposed 180° to the recessed portion maybe formed as a sloping surface which increases in diameter as it goes toward the lower portion thereof and also as it goes further in the radial direction.

Referring further to the hub 902 shown in FIG. 15, the portion 902b opposed 180° to the recessed portion is structured such that, when it is viewed from the top surface thereof, the peripheral surface thereof increases in diameter substantially in the same manner as the clamp member 908. When it is viewed from the side surface thereof, the peripheral surface of the portion 902b is formed such that the peripheral surface thereof increases in diameter as it goes toward the lower portion thereof. The increased-diameter portion 902b may be molded integrally with the hub 902, or may be molded separately from the hub 902. In both cases, the increased-diameter portion 902b is easy to mold.

As described above, according to the sixth and seventh inventions, since the hub includes the sloping portion only one side in the axial direction thereof and the opposite side portion of the sloping portion, that is, the recessed portion to be fitted by the clamp member does not slope, after molded, the hub can be pulled out as it is along the axial direction thereof. This eliminates the use of a complicated metal mold using a sliding core and the hub can be manufactured easily using a metal mold having a simple structure. Further, since the hub includes a sloping surface in the 180° opposed portion, when the magnetic tape is wound, the magnetic tape can be prevented against movement in the vertical direction, which makes it possible for the magnetic tape to provide a good winding shape.

Figure 16:
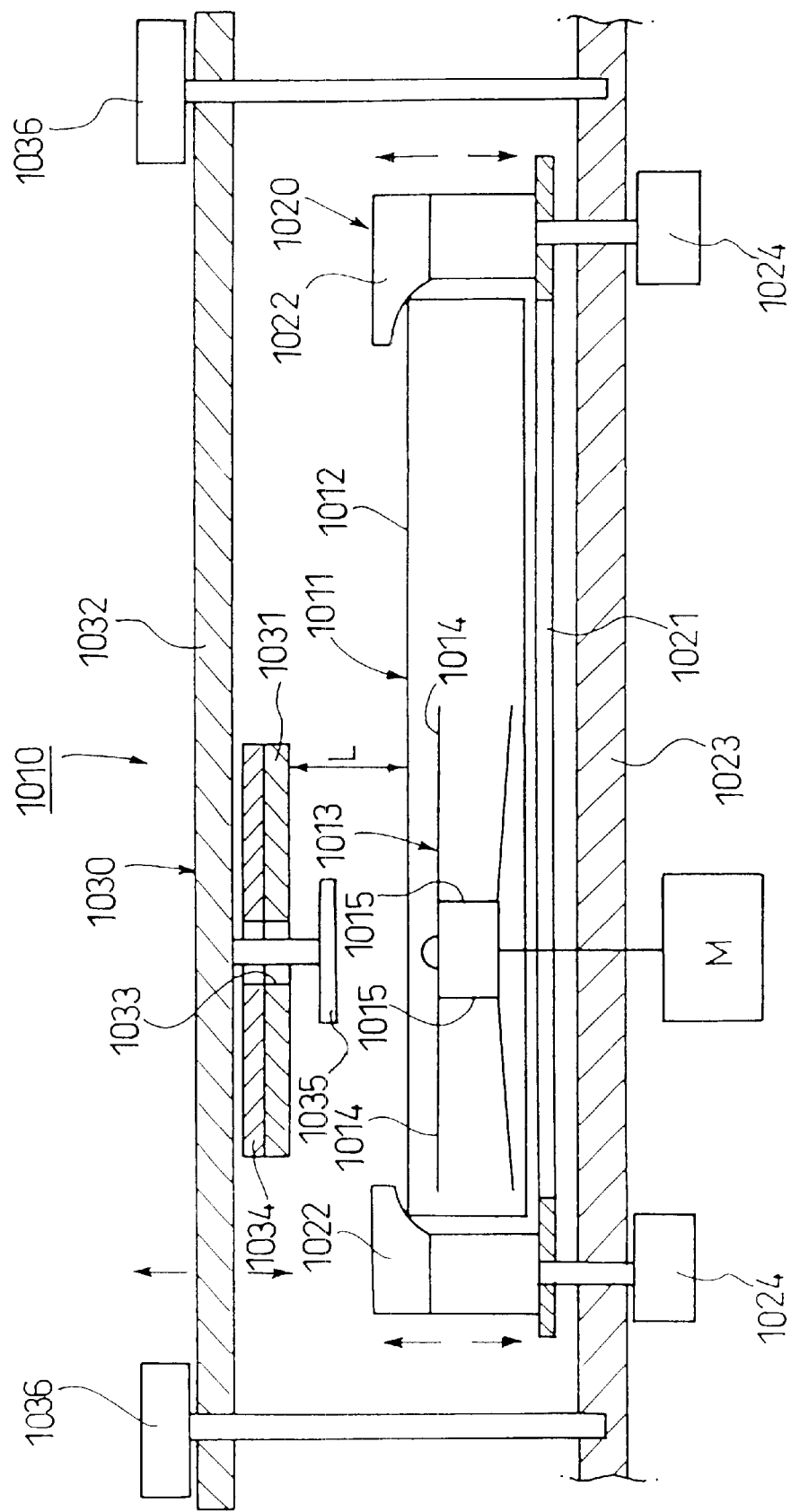
FIG. 16 is a schematic plan view of a magnetic tape take-up apparatus according to an embodiment of the eighth invention.

Next, description will be given below of an embodiment according to an eighth invention. FIG. 16 is a schematic plan view of a magnetic tape take-up apparatus according to an embodiment of the eighth invention.

Referring now to FIG. 16, in the present magnetic tape take-up apparatus 1010, a magnetic tape (not shown), which is being wound by a reel drive mechanism (not shown) from a tape supply source (not shown) onto the tape reel 1013 of a magnetic tape cassette 1011 with its cassette half 1012 held by a half hold mechanism 1020, is energized near to the upper flange 1014 (in FIG. 16, the upper side) of the tape reel 1013 in a non-contact manner by a magnetic field generating mechanism 1030 to thereby arrange the winding shape of the magnetic tape with the inner surface of the upper flange 1014 of the tape reel 1013 as a reference.

Conventionally, the tape reel 1013 of the magnetic tape cassette 1011 is formed of ABS resin; but, on the other hand, according to the present embodiment, in order to reduce the rate of occurrence of heat loss as much as possible, the tape reel 1013 is formed of polystyrene.

With the lower surface of the cassette half 1012 of the magnetic tape cassette 1011 engaged with a support plate 1021, the half hold mechanism 1020 brings a pair of half buckets 1022 into engagement with the edge portion of the upper surface of the cassette half 1012 to thereby hold the cassette half 1012 in a given position. The half buckets 1022 are supported on a winder panel 1023 in such a manner that they can be moved in the vertical direction in FIG. 16; and, specifically, they can be moved in the vertical direction in FIG. 16 by their associated bucket operating air cylinders 1024.

The reel drive mechanism is structured such that, for example, the rotary shaft of an electric motor (not shown) is fitted into the tape reel 1013 of the magnetic tape cassette 1011 and, by rotating the electric motor forwardly or reversely, the tape reel 1013 can be rotated in a given rotation direction. That is, in this manner, the reel drive mechanism winds the magnetic tape from the tape supply source around the tape winding surface 1015 of the tape reel 1013 at a winding speed of 2 m/s and with a winding tension of 65 g.

The magnetic field generating mechanism 1030 is structured such that a magnet is fixed to the inner surface (in FIG. 16, the lower surface) of a magnet mounting panel 1032, and the mechanism 1030 is disposed opposed to the upper surface of the cassette half 1012 of the magnetic tape cassette 1011.

The magnet 1031 is a magnet formed substantially in a circular shape. And, substantially in the central portion of the magnet 1031, there is opened up a penetration hole 1033, so that the magnet 1031 is formed as a doughnut-shaped magnet. Also, the magnet 1031 is formed of neodymium and has a thickness of 16 mm and a magnetic flux density of 12800–13300 G. A yoke 1034 (a shield plate) having a thickness of 13 mm is applied to the back surface of the magnet 1031.

The area of the portion (the area of the lower surface in FIG. 16) of the magnet 1031 that is opposed to the upper surface of the cassette half 1012 of the magnetic tape cassette 1011 is set 1.3 times the area of the side surface side of the magnetic tape to be wound around the tape winding surface 1015 of the tape reel 1013. Due to this, a magnetic field given by the magnet 1031 can be applied uniformly onto the side surface of the magnetic tape from the upper flange 1014 side of the tape reel 1013. In case where the present area is less than 1.3 times, a magnetic field acting on the winding end portion of the magnetic tape becomes weak, thereby causing the winding end portion of the magnetic tape to be arranged in disorder.

The magnetic field generating mechanism 1030, with the movement of the magnet mounting panel 1032 in the downward direction in FIG. 16, energizes the tape reel 1013 downward in FIG. 16 using a reel hold member 1035 which is projected out from the penetration hole 1033 of the magnet 1031. And, the magnetic field generating mechanism 1030 stops the movement of the magnet mounting panel 1032 at a position (which is hereinafter referred to as a tape winding position) where a clearance L between the lower surface (in FIG. 16) of the magnet 1031 and the upper surface of the cassette half 1012 of the magnetic tape cassette 1011 is 10 mm, and allows the magnet 1031 to apply its magnetic field from the upper flange 1014 side (in FIG. 16, the upper side) of the tape reel 1013 onto the side surface side (in FIG. 16, the upper side) of the magnetic tape. By the way, a clearance between the upper surface of the cassette half 1012 and the upper surface of the upper flange 1014 of the tape reel 1013 is 4 mm and, therefore, a clearance between the lower surface of the magnet 1031 and the upper surface of the upper flange 1014 is 14 mm.

The magnet mounting panel 1032 is supported so as to be movable to two sides: that is, one side (in FIG. 16, lower side) where a clearance between the winder panel 1023 and itself is narrowed; and the other side (in FIG. 16, upper side) where the clearance is widened. And, the magnet mounting panel 1032 can be moved by panel operating air cylinders 1036.

Specifically, the magnet mounting panel 1032, when the cassette half 1012 of the magnetic tape cassette 1011 is loaded, is moved by the panel operating air cylinders 1036 to the side (in FIG. 16, upper side) where the clearance between the winder panel 1023 and itself is widened (a position shown in FIG. 16; which is hereinafter referred to as a cassette half loading position). This makes it possible to facilitate the loading of the cassette half 1012.

Also, the magnet mounting panel 1032, when the magnetic tape is wound around the tape reel 1013, is moved by the panel operating air cylinders 1036 to the side (in FIG. 16, lower side), where the clearance between the winder panel 1023 and itself is narrowed, up to the tape winding position. Due to this, at the tape winding position, the tape reel 1013 can be energized to the lower side in FIG. 16 through the reel hold member 1035.

Now, description will be given below of the operation of the present embodiment.

When the magnetic tape is wound around the tape reel 1013 of the magnetic tape cassette 1011, firstly, with the magnet mounting panel 1032 set at the cassette half loading position, the cassette half 1012 of the magnetic tape cassette 1011 is inserted into between the half buckets 1022 and support plate 1021.

Next, by actuating the bucket operating air cylinders 1024, the cassette half 1012 of the magnetic tape cassette 1011 is held in a given position between the half buckets 1022 and support plate 1021. At the same time, by actuating the panel operating air cylinders 1036, the magnet mounting panel 1032 is moved to thereby set the magnet 1031 at the tape winding position.

At the then time, the clearance L between the lower surface (in FIG. 16) of the magnet 1031 and the upper surface of the cassette half 1012 of the magnetic tape cassette 1011 is maintained at 10 mm (the clearance between the magnet 1031 and upper flange 1014 is maintained at 14 mm), and the magnet 1031 applies a magnetic field onto the magnetic tape being wound from the upper flange 1014 side (in FIG. 16, from the upper side) of the tape reel 1013.

In this state, in case where the electric motor of the reel drive mechanism is rotated, the tape reel 1013 is rotated in a given rotation direction and the magnetic tape from the tape supply source is wound around the tape winding surface 1015 of the tape reel 1013 at the winding speed of 2 m/s and with the winding tension of 65 g.

Therefore, the winding shape of the magnetic tape can be arranged with the inner surface of the upper flange 1014 of the tape reel 1013 of the magnetic tape cassette 1011 as a reference.

Next, the present inventors have checked the influence of the clearance L between the magnet 1031 and the upper surface of the cassette half 1012 of the magnetic tape cassette 1011 on the winding shape of the magnetic tape wound around the tape reel 1013 of the magnetic tape cassette 1011.

In case where the above clearance L was set at less than 8 mm, for example, L=5 mm (the clearance between the magnet 1031 and upper flange 1014 was 9 mm), the action of the magnetic field given by the magnet 1031 was excessively strong so that, when the magnetic tape was wound, the upper flange 1014 of the tape reel 1013 was contacted with the inner surface of the cassette half 1012 to thereby cause friction between them.

On the other hand, in case where the clearance L exceeds 13 mm, for example, the clearance L=15 mm (the clearance between the magnet 1031 and upper flange 1014 was 19 mm), the action of the magnetic field given by the magnet 1031 was excessively weak so that the winding shape of the entire magnetic tape was found poor.

However, as in the present embodiment, in the case of the clearance L=10 mm (the clearance between the magnet 1031 and upper flange 1014 was 14 mm), the friction, which could otherwise be caused between the upper flange 1014 of the tape reel 1013 and the inner surface of the cassette half 1012 due to their mutual contact in the magnetic tape winding operation, could be prevented positively. Also, the rate of occurrence of the poor magnetic tape winding shape could be reduced by the optimization of the clearance L and proper selection of the magnetic tape.

Also, the inventors have checked the influences of the magnetic tape winding speed by the reel drive mechanism on the tape reel 1013 with the winding tension set at 65 g. The check results are shown in FIG. 17.

Figure 17:
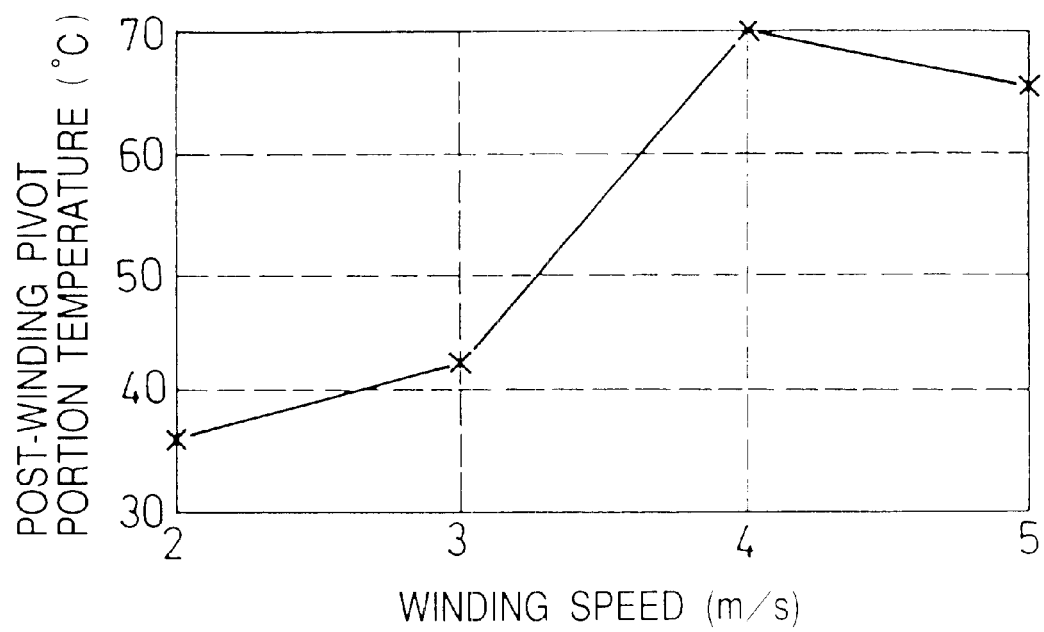
FIG. 17 is a graphical representation of the relationship between a winding speed and a pivot portion temperature.

As can be seen from FIG. 17, in case where the winding speed is set at 2 m/s as in the present embodiment, the temperature of the pivot portion (the projecting portion of the tape winding surface 1015) of the tape reel 1013 can be controlled down to a low level (in FIG. 17, approx. 36° C.), thereby eliminating a fear that a heat loss can be incurred in the pivot portion.

On the other hand, in case where the winding speed is equal to or higher than 3 m/s, the temperature of the pivot portion of the tape reel 1013 rises suddenly (in FIG. 17, approx. 40–70° C.); specifically, in case where the temperature of the pivot portion is 40° C. or higher, a heat loss can be incurred in the pivot portion.

Further, the inventors have checked the influences of the magnetic tape winding speed by the reel drive mechanism on the magnetic tape winding shape with the winding tension set at 65 g. The check results are shown in FIG. 18.

Figure 18:
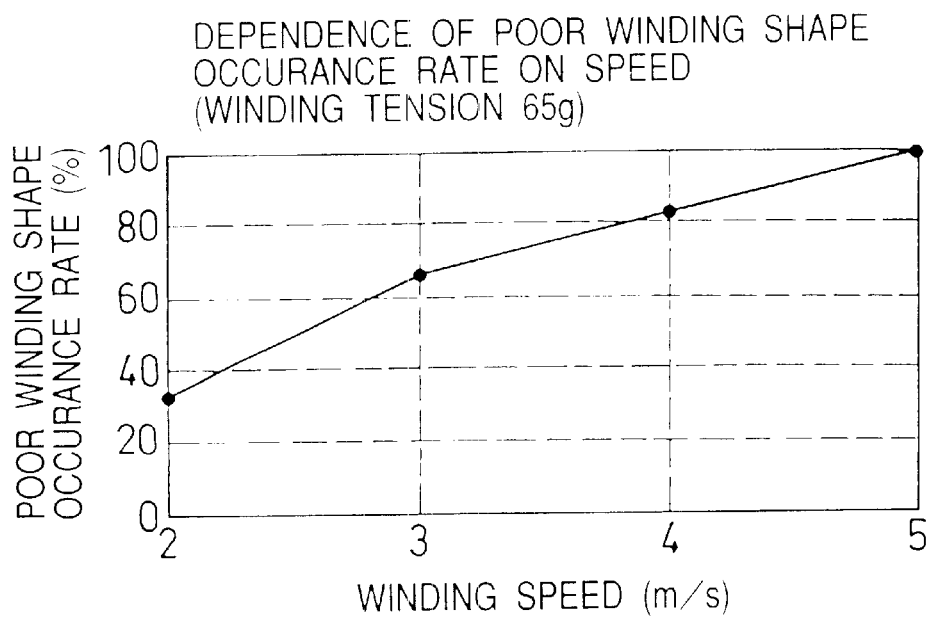
FIG. 18 is a graphical representation of the relationship between a winding speed and a poor winding shape occurrence rate.

As can be seen from FIG. 18, in case where the winding speed is 2 m/s as in the present embodiment, the rate of occurrence of the poor magnetic tape winding shape can be controlled down to a low level (in FIG. 18, 30-odd %).

On the other hand, in case where the winding speed is equal to or higher than 3 m/s, the rate of occurrence of the poor magnetic tape winding shape rises suddenly (in FIG. 18, 60-odd %–100%).

Figure 19:
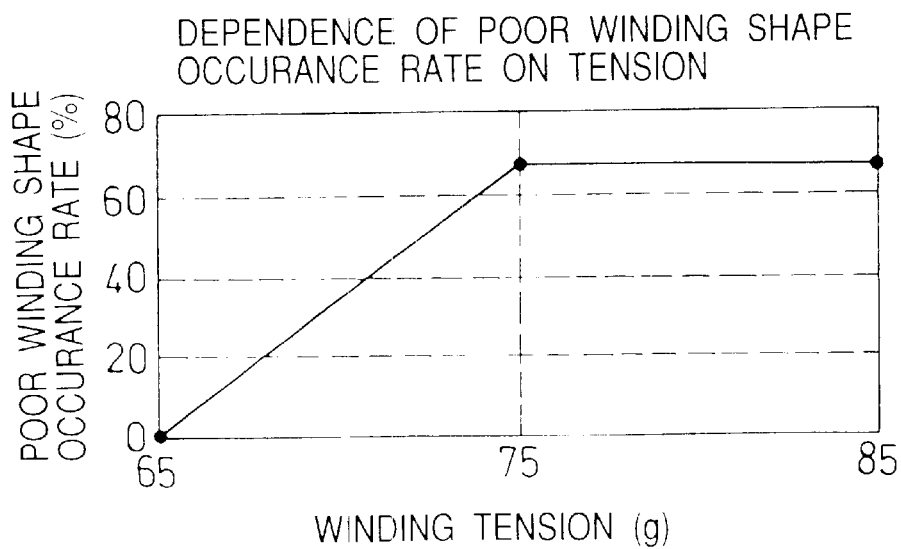
FIG. 19 is a graphical representation of the relationship between a winding tension and a poor winding shape occurrence rate.

Further, the present inventors have checked the influences of the winding tension of the magnetic tape by the reel drive mechanism on the magnetic tape winding shape with the winding speed set at 2 m/s. The check results are shown in FIG. 19. By the way, these data are obtained through proper selection of the magnetic tape.

As can be seen from FIG. 19, in case where the winding tension is 65 g as in the present embodiment, the rate of occurrence of the poor magnetic tape winding shape is 0%.

On the other hand, in case the winding tension exceeds 65 g, the rate of occurrence of the poor magnetic tape winding shape rises suddenly (in FIG. 19, 60-odd %).

In case where the winding tension is less than 65 g, it is difficult to secure the winding hardness of the magnetic tape.

As described above, according to the present embodiment, using the reel drive mechanism, the magnetic tape from the tape supply source is taken up around the tape winding surface 1015 of the tape reel 1013 of the magnetic tape cassette 1011 at the winding speed of 2 m/s and with the winding tension of 65 g. Also, to the magnetic tape being wound around the tape reel 1013 by the reel drive mechanism, there is applied a magnetic field by the magnet 1031 formed of neodymium and having a magnetic flux density of 12800–13300 G from a position which is present on the upper flange 1014 side (in FIG. 16, the upper side) of the tape reel 1013 and has the clearance L=10 mm with respect to the cassette half 1012 (the clearance between the magnet 1031 and upper flange 1014 is 14 mm).

Thanks to this, the winding shape of the magnetic tape can be arranged with the inner surface of the upper flange 1014 of the tape reel 1013 as a reference, the running state of the magnetic tape in the recording and reproducing apparatus can be stabilized, and the running passage of the magnetic tape can be positively prevented from being shifted greatly.

Figure 28:
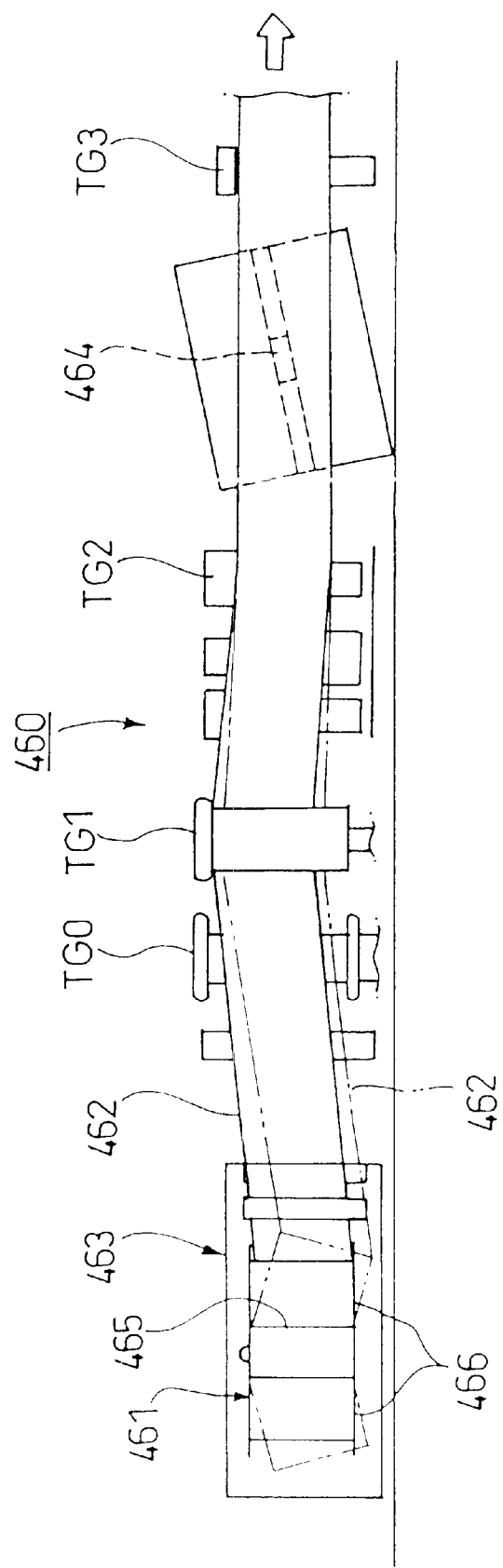

For example, in the recording and reproducing apparatus 460 as shown in FIG. 28, the magnetic tape 462 wound around the tape reel 461 by the magnetic tape take-up apparatus according to the present embodiment is able to run along the running passage shown by a solid line in FIG. 28 without shifting from the running passage.

In other words, the magnetic tape 462 played out from the tape reel 461 is lifted once up to the upper limit position by the tape guide TG1 through the tape guide TG0, the magnetic tape 462 at the upper limit position is controlled in position by the tape guide TG1, after then, the magnetic tape 462 is controlled in position to its original or normal position between the tape guides TG2 and TG3 by the tape guide TG2, and the magnetic tape 462 is contacted with the recording and reproducing head 464 at a given relative position.

This makes it possible to positively prevent occurrence of unrepairable serious defects in the recording and reproduction of the magnetic tape 462 such as reduced output and poor interchangiability.

As described above, according to the eighth invention, in case where the tape reel is rotated by the drive means, the magnetic tape is wound around the tape reel at the winding speed of 2–2.5 m/s and with the winding tension of 60–70 g; and, the magnetic field generating means including a magnet formed of neodymium and having a magnetic flux density of 12800–13300 G applies a magnetic field to the magnetic tape from a position opposed to the upper flange of the tape reel with a clearance of 12–17 mm between them. Therefore, the winding shape of the magnetic tape can be arranged with the upper flange of the tape reel as a reference, which makes it possible to stabilize the running of the magnetic tape in the recording and reproducing apparatus.

Also, since the area of the portion of the magnetic field generating means that is opposed to the upper flange of the tape reel is set 1.3 times or more the area of the side surface side of the magnetic tape to be wound around the tape reel, the magnetic field given by the magnetic field generating means can be applied evenly to the magnetic tape from the upper flange side of the tape reel, thereby being able to positively prevent the magnetic tape from being wound in disorder.

Although description has been given heretofore of the preferred embodiments of the invention, the present invention is not limited to these embodiments but other various changes and modifications are also possible. For example, the structures of the respective illustrated embodiments may be properly combined together. Also, the invention can also apply to other magnetic tape cassettes than DVC and beta cam.

INDUSTRIAL APPLICABILITY OF THE INVENTION

According to the first invention, since the receiving surface for use in the supersonic welding of the welding bosses is formed in the portion of the opposite surface of the lower flange of the tape reel to the hub that is situated inside the reference ring in the radial direction, the efficiency of transmission of the oscillation energy of the supersonic waves to the welding bosses can be enhanced. This not only can reduce the time necessary for the supersonic welding of the welding bosses but also can enhance the welding stability.

Also, because the distance between the reference ring and receiving surface is set constant regardless of the sizes of the tape reels, the welding can be enforced using the same equipment.

According to the second invention, since, in the portions of the upper and lower flanges that adjoin the hub, there are formed flat surfaces extending at right angles to the side surface of the hub and having a given width in the radial direction of the flanges, during the initial winding stage while the magnetic tape is being wound between the flat surfaces of the upper and lower flanges, the side edges of the magnetic tape are formed by the flat surfaces, thereby eliminating a fear that the magnetic tape can be vibrated in the vertical direction. Therefore, the winding surface to be formed by the side edges of the magnetic tape becomes flat and thus a good winding shape can be obtained in the magnetic tape wound.

According to the third invention, the lower flange of the tape reel includes a large-thickness stepped portion which is formed to be continuous with the outside annular-shaped rib, while the thickness of the portion of the large-thickness stepped portion opposed to the edge portion of the reel hole of the lower cassette half is set at a given value or more.

Therefore, high dust-proof property can be secured in the interior of the tape reel when the magnetic tape cassette is not in use, the deformation of the lower flange of the tape reel can be prevented positively, and a sufficient clearance between the lower flange and lower cassette half can be secured.

According to the fourth invention, in the edge portion of the reel hole formed in the lower cassette half, there are disposed not only the annular-shaped projecting portion but also, outside the annular-shaped projecting portion in the radial direction, the annular-shaped recessed portion; and, at the position in the inner surface of the lower flange of the tape reel that is opposed to the annular-shaped recessed portion, there is disposed the annular-shaped projection 5 which can be loosely fitted into the annular-shaped recessed portion.

Thanks to this, high dust-proof property can be secured in the interior of the tape reel when the magnetic tape cassette is not in use, the deformation of the lower flange of the tape reel can be prevented positively, and a sufficient clearance between the lower flange and lower cassette half can be secured.

According to the fifth invention, the required R shapes are respectively applied to the edge portions of at least flange-radial-direction two sides of the air discharging recessed portions or air discharging penetration holes formed in the upper or lower flange.

Thanks to this, the damage of the magnetic tape due to its contact with the edge portions of the air discharging recessed portions or air discharging penetration holes of the upper or lower flange of the tape reel can be prevented, which allows the tape reel to cope with the enhanced density of the magnetic tape recording.

According to the sixth and seventh inventions, since the hub is structured such that only one side in the axial direction thereof slopes and the opposite side of the sloping portion, that is, the recessed portion to be fitted with the clamp member does not slope, after molded, the hub as it is can be pulled out along the axial direction thereof. This eliminates the provision of a complicated metal mold using a slide core and thus the hub can be manufactured easily using a metal mold having a simple structure. Further, because the hub includes the sloping surface in the 180° opposed portion, the magnetic tape can be prevented from being moved in the vertical direction when it is wound, thereby being able to obtain a good winding shape of the magnetic tape.

According to the eighth invention, in case where the drive means rotates the tape reel, not only the magnetic tape is wound around the tape reel at the winding speed of 2–2.5 m/s and with the winding tension of 60–70 g, but also the magnetic field generating means including a magnet formed of neodymium and having a magnetic flux density of 12800–13300 G applies a magnetic field to the magnetic tape from a position opposed to the upper flange of the tape reel with a clearance of 12–14 mm between them. Thanks to this, the winding shape of the magnetic tape can be arranged with the upper flange of the tape reel as a reference, thereby being able to stabilize the running of the magnetic tape in the recording and reproducing apparatus.

Also, since the area of the portion of the magnetic field generating means opposed to the upper flange of the tape reel is set 1.3 or more times the area of the side surface side of the magnetic tape to be wound around the tape reel, the magnetic field given by the magnetic field generating means can be applied uniformly to the magnetic tape from the upper flange side of the tape reel, which makes it possible to positively prevent the magnetic tape from being wound in disorder.

What is claimed is:

1. A magnetic tape reel, comprising:
    a hub for winding a magnetic tape therearound; and
    a clamp member;
    wherein the outer surface of said clamp member for holding a leader tape between itself and a recessed portion formed in said hub and a peripheral surface of said hub that, when viewed from the top plan surface of said hub, is disposed 180° opposed to said recessed portion are respectively tapered surfaces which slope in mutually opposite directions with respect to the axis of rotation of said magnetic tape reel.

2. The magnetic tape reel of claim 1, wherein the outer surface of said clamp member decreases in diameter from an upper portion to a lower portion of the clamp member.

3. The magnetic tape reel of claim 2, wherein the recessed portion of the hub is not sloped.

4. A method for manufacturing a magnetic tape reel having a structure that, in a hub for winding a magnetic tape therearound, there is formed a recessed portion for holding a leader tape using a clamp member and
    the peripheral surface of said hub that, when viewed from the top plan surface of said hub, is disposed 180° opposed to said recessed portion is a tapered surface sloping toward the axis of rotation of said hub, said method comprising the steps of:
    injection molding said magnetic tape reel; and,
    pulling out said injection molded magnetic tape reel along the axial direction thereof.

5. The method for manufacturing a magnetic tape reel of claim 4, wherein the recessed portion of the hub is not sloped.

* * * * *